(12) United States Patent
Kakoyiannis et al.

(10) Patent No.: US 12,148,408 B2
(45) Date of Patent: *Nov. 19, 2024

(54) SYSTEMS AND METHODS FOR TRANSFORMING DIGITAL AUDIO CONTENT INTO VISUAL TOPIC-BASED SEGMENTS

(71) Applicant: Tree Goat Media, Inc., New York, NY (US)

(72) Inventors: Michael Kakoyiannis, Garden City, NY (US); Sherry Mills, New York, NY (US); Christoforos Lambrou, Nicosia (CY); Vladimir Canic, Belgrade (RS); Srdjan Jovanovic, Belgrade (RS)

(73) Assignee: Tree Goat Media, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,054

(22) Filed: Sep. 5, 2023

(65) Prior Publication Data

US 2024/0177695 A1     May 30, 2024

Related U.S. Application Data

(63) Continuation of application No. 17/172,201, filed on Feb. 10, 2021, now Pat. No. 11,749,241, which is a
(Continued)

(51) Int. Cl.
*G10H 1/00* (2006.01)
*G06F 16/68* (2019.01)
*G06F 16/683* (2019.01)

(52) U.S. Cl.
CPC ......... *G10H 1/0008* (2013.01); *G06F 16/685* (2019.01); *G06F 16/686* (2019.01); *G10H 2220/106* (2013.01)

(58) Field of Classification Search
CPC ............ G10H 1/0008; G10H 2220/106; G06F 16/685; G06F 16/686
(Continued)

(56) References Cited

U.S. PATENT DOCUMENTS 6,070,167 A * 5/2000 Qian ................ H04N 21/47205
707/999.102
9,213,705 B1 * 12/2015 Story, Jr. ............. G06F 16/4393
(Continued)

FOREIGN PATENT DOCUMENTS

EP          2202647 A1 *  6/2010  ....... G06F 16/24578

*Primary Examiner* — Christina M Schreiber
(74) *Attorney, Agent, or Firm* — UB Greensfelder LLP; Brian E. Turung

(57) ABSTRACT

A system for platform-independent visualization of audio content, in particular audio tracks utilizing a central computer system in communication with user devices via a computer network. The central system utilizes various algorithms to identify spoken content from audio tracks and selects visual assets associated with the identified content. Thereafter, a visualized audio track is available for users to listen and view. Audio tracks, for example Podcasts, may be segmented into topical audio segments based upon themes or topics, with segments from disparate podcasts combined into a single listening experience, based upon certain criteria, e.g., topics, themes, keywords, and the like.

10 Claims, 16 Drawing Sheets

Related U.S. Application Data continuation of application No. 16/506,231, filed on Jul. 9, 2019, now Pat. No. 10,971,121.

(60) Provisional application No. 62/814,018, filed on Mar. 5, 2019, provisional application No. 62/695,439, filed on Jul. 9, 2018.

(58) Field of Classification Search
USPC .......................................................... 84/609
See application file for complete search history.

(56) References Cited

U.S. PATENT DOCUMENTS

| | | | | |
|---|---|---|---|---|
| 9,785,639 | B2* | 10/2017 | Calhoun | G06F 16/43 |
| 10,424,294 | B1* | 9/2019 | Lema | G10L 15/02 |
| 10,431,242 | B1* | 10/2019 | Médioni | G10L 15/22 |
| 10,971,121 | B2* | 4/2021 | Kakoyiannis | G06F 16/61 |
| 11,735,203 | B2* | 8/2023 | Younessian | H04N 21/251 |
| | | | | 381/56 |
| 11,749,241 | B2* | 9/2023 | Kakoyiannis | G06F 16/685 |
| | | | | 84/609 |
| 2002/0093591 | A1* | 7/2002 | Gong | H04N 21/2368 |
| | | | | 348/E7.063 |
| 2007/0260968 | A1* | 11/2007 | Howard | G11B 27/034 |
| 2008/0005699 | A1* | 1/2008 | Dvorak | G06F 3/04815 |
| | | | | 715/836 |
| 2009/0044686 | A1* | 2/2009 | Vasa | G11B 27/031 |
| | | | | 84/609 |
| 2010/0161441 | A1* | 6/2010 | Hounsell | G06F 16/4387 |
| | | | | 725/35 |
| 2010/0161580 | A1* | 6/2010 | Chipman | G06F 16/24578 |
| | | | | 707/706 |
| 2010/0241963 | A1* | 9/2010 | Kulis | G06F 16/685 |
| | | | | 707/706 |
| 2011/0252947 | A1* | 10/2011 | Eggink | G06F 16/683 |
| | | | | 84/609 |
| 2011/0276567 | A1* | 11/2011 | Asikainen | G06F 16/68 |
| | | | | 707/E17.101 |
| 2014/0053710 | A1* | 2/2014 | Serletic, II | G06F 3/0481 |
| | | | | 84/609 |
| 2015/0278181 | A1* | 10/2015 | Gevlich | G06F 40/169 |
| | | | | 715/730 |
| 2017/0092246 | A1* | 3/2017 | Manjarrez | G06F 3/165 |
| 2017/0352361 | A1* | 12/2017 | Thörn | G11B 27/031 |
| 2018/0032610 | A1* | 2/2018 | Cameron | G10L 15/18 |
| 2018/0039859 | A1* | 2/2018 | Harwath | G06V 20/35 |
| 2018/0052920 | A1* | 2/2018 | Klein | G06F 16/632 |
| 2018/0174587 | A1* | 6/2018 | Bermundo | G06F 3/1271 |
| 2019/0237051 | A1* | 8/2019 | Silverstein | G06N 7/01 |
| 2019/0355336 | A1* | 11/2019 | Steinwedel | H04L 12/1813 |
| 2020/0013380 | A1* | 1/2020 | Kakoyiannis | G06F 16/685 |
| 2020/0320898 | A1* | 10/2020 | Johnson | G10L 15/08 |
| 2020/0387538 | A1* | 12/2020 | Shintani | G06F 16/685 |
| 2021/0082382 | A1* | 3/2021 | Pinhas | G06F 16/685 |
| 2021/0166666 | A1* | 6/2021 | Kakoyiannis | G10H 1/0008 |
| 2022/0208155 | A1* | 6/2022 | Ivers | G10H 1/368 |
| 2022/0222294 | A1* | 7/2022 | Wang | G06F 16/685 |
| 2023/0142904 | A1* | 5/2023 | Komich | H04N 21/2187 |
| | | | | 704/235 |
| 2023/0230564 | A9* | 7/2023 | Kakoyiannis | G10H 1/0008 |
| | | | | 84/609 |
| 2023/0280966 | A1* | 9/2023 | Imbruce | G06F 16/64 |
| | | | | 704/235 |
| 2023/0343329 | A1* | 10/2023 | Figov | G06F 40/30 |
| 2023/0410793 | A1* | 12/2023 | Clifton | G06N 3/045 |
| 2024/0087547 | A1* | 3/2024 | Ivers | G10H 1/0008 |
| 2024/0177695 | A1* | 5/2024 | Kakoyiannis | G10H 1/0008 |

* cited by examiner

SYSTEMS AND METHODS FOR TRANSFORMING DIGITAL AUDIO CONTENT INTO VISUAL TOPIC-BASED SEGMENTS

This application is a continuation of U.S. patent application Ser. No. 17/172,201 filed Feb. 10, 2021, which in turn claims priority on U.S. patent application Ser. No. 16/506,231 filed Jul. 9, 2019, which in turn claims priority on U.S. Provisional Patent Application Ser. No. 62/695,439 filed Jul. 9, 2018, all of which are incorporated herein by reference.

This application is a continuation of U.S. patent application Ser. No. 17/172,201 filed Feb. 10, 2021, which in turn claims priority on U.S. patent application Ser. No. 16/506,231 filed Jul. 9, 2019, which in turn claims priority on U.S. Provisional Patent Application Ser. No. 62/814,018 filed Mar. 3, 2019, all of which are incorporated herein by reference.

BACKGROUND

The present disclosure relates to digital audio (topic-based segmentation, search, visibility to search engines, monetization, its ability to be monetized via advertising) and associating visuals (images, still and/or motion photos, cinemographs, videos, looping videos, gifs, animation, etc.). It finds particular application in conjunction with podcasting and will be described with particular reference thereto. However, it is to be appreciated that the present exemplary embodiment is also amenable to other like applications, including and not limited to audiobooks, broadcast radio, streaming radio, music, virtual reality, and/or educational audio/visual tools and products.

Presently, digital audio is not readily searchable, indexable, or shareable via social media in any modern graphic sense. In this way, digital audio remains outside the realm of social media and the modern Internet. On the other hand, text and images are machine-readable, whereas digital audio is not. That is, audio bits cannot be recognized by software. For example, the Google® search engine does not have an audio tab, rather it is configured to readily search images and text. If a search engine such as Google® cannot "see" audio, then neither can advertisers. There is no way to pictorially represent the topics discussed in millions of hours of listening. Sponsors have billions of dollars in digital advertising they would like to pair with audio, but there are no highly targeted, digital vehicles to reach those audiences.

There is an outdated radio advertising-type model in place within the audio podcasting space. As used herein, a podcast refers to a digital audio file made available via the Internet for downloading to a personal computer or mobile device, which may be listened to by a user at the user's convenience. The major players in podcast advertising monetization still generate the great majority of their revenues from host-read audio advertisements that are inserted into an episode's structure in just the same way as traditional radio. Creating traditional radio-style audio advertisements means significant time and cost for the advertiser, who must work individually with each show host and/or their representation to craft and execute an advertisement that favorably positions its brand, while in the authentic style of the host. This means that advertisers will only work with the top podcasters, and this leaves behind a significant amount of the market. As all podcasts provide direct access to trusting and engaged listeners, and according to the Interactive Advertising Bureau, a majority of podcast listeners have taken action as a result of an ad in a podcast, this means a lot of potential revenue is left on the table. There is no easy or cost-effective system allowing advertisers to reach their target customers in that larger pool of episodes.

The industry currently ripest for a monetization revolution is podcasting. Considered the most rapidly growing media content platform, podcasting is on the verge of triggering an audio revolution. Nearly one in five Americans regularly listen to podcasts. This is a 17% increase of listeners over the prior year, with monthly listenership up 75% from 2013. As it is currently constituted, however, podcasting poses a significant challenge in the audio space for advertisers, due in part to limited and largely unreliable metrics and the inefficient search tools available. In fact, most podcasts generate no meaningful revenue. Only the top 10% of podcasters can take advantage of audio advertising. Monetization advancements are urgently needed in order to unlock the value inherent in the podcast media.

Important entities in the podcasting space include Spotify®, iTunes®, Stitcher®, and Pandora®. Music platform Spotify® has 217 million monthly active users, of which 100 million pay for premium subscription, putting it ahead of Apple Music globally. Recently acquiring podcast networks Gimlet Media and Anchor, Spotify® is looking to grow its share of the podcast market by converting its music listeners into podcast listeners. iTunes® currently dominates over 65% of total podcast listenership. However, it offers poor quality text search and no "wow" factor. Stitcher® focuses on curating share-worthy titles for podcasts, and provides a more visual search than iTunes®, but it doesn't divide its content into "topics" and has poor customer ratings. Pandora® has 78 million active monthly users and has recently experimented with introducing podcasts, but the hefty music licensing fees of Pandora® make that focus prohibitive. None of these entities offer audio platforms that "visualize" and "topic segment" audio.

Some efforts in the industry have been centered on turning digitally recorded talk-based audio (namely, podcasts) into translated text, such as commercially available software from PopUpArchive™. Although the text itself may be keyword searchable, it does not identify the true underlying nature of the topics being discussed or segment conversation effectively into standalone topics and, thus, cannot truly break down discussion into distinct topical audio segments. Furthermore, transcripts are a grey area in computer recognition. Too many keywords make them of lesser value for those seeking targeted advertising. Currently, there is no audio platform allowing users to search for content and find specific audio segments and related topics buried within audio in a modern, visual way.

In 2004, most blogs (regularly updated websites or web pages) were discovered via links on more popular blogs; today new blogs are usually discovered on social networks. Podcasts, which can be vaguely characterized as an "audio" blog, however, struggle with respect to search and discovery. While the iTunes® platform has a front page and a blackbox ranking system, the requirement to download a file and spend time listening makes it hard to spread a podcast virally. Many podcasts are instead built off of established brands, e.g., National Public Radio ("NPR") or the personal brands of the podcast hosts. Blogs can be read via Uniform Resource Locators ("URL") typed in any Internet browser currently in use, e.g. Safari®, FireFox®, Chrome®, Internet Explorer®, and the like. Podcasts are much more complicated: a user either has to search a third-party podcast player's directory (iTunes® or self-contained) to add a show, or copy-and-paste a feed address. Alternately, the user can simply listen to a podcast on a website, but that is a suboptimal experience. Often, a solution that works for sophisticated users is actually prohibitive for average users. Rich Site Summary ("RSS") readers are an illustrative example: RSS feeds were only ever viewed by a fraction of readers because they were too difficult to use.

Podcasting is the fastest-growing content platform in the digital media universe, yet there is a disconnect between the popularity of digital talk audio with listeners and its value for sponsors. Accordingly, what is needed is a system and method which overcomes these problems and others, including the solutions to core issues surrounding the digital audio industry's monetization, measurement, and search and discovery problems.

BRIEF DESCRIPTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with one non-limiting aspect of the present disclosure, there is provided a method for packaging audio content to facilitate searching and sharing of sent audio content. The method includes, with a segmentation module, dividing an audio signal of an audio track containing spoken content and having a runtime into at least one audio segment. The method further includes generating an indexed audio segment by associating the at least one audio segment with at least one textual element. At least one visual asset is then paired with the indexed audio segment.

In accordance with another and/or alternative non-limiting aspect of the present disclosure, there is provided a content system for platform-independent visualization of audio content. The system includes a central computer system including a processor and a memory in communication with the processor, the memory storing instructions which are executed by the processor. The system further includes an audio segmenting subsystem including an audio resource containing at least one audio track, the audio segmenting subsystem configured to divide an audio track from the audio resource into at least one audio segment and generate an indexed audio segment by associating the at least one audio segment with at least one audio textual element, wherein the at least one audio textual element relates to a spoken content captured within the audio track. The content system also includes a visual subsystem including a video resource storing at least one visual asset, the visual subsystem configured to generate an indexed visual asset by associating at least one visual textual element to the at least one visual asset. The content system is configured to generate a packaged audio segment by associating the indexed audio segment with the indexed visual asset.

In accordance with another and/or alternative non-limiting aspect of the present disclosure there is provided a system for platform-independent visualization of audio content. The system includes a central computer system that includes a processor, a network interface in communication with the processor, and memory in communication with the processor. The memory stores instructions which are executed by the processor to search for at least one podcast responsive to a search request received via an associated computer network, determine at least one keyword in the at least one podcast from the audio content therein, wherein the at least one keyword is identified via voice recognition, identify at least one image corresponding to the determined at least one keyword in an associated database, generating a visualization of the podcast utilizing the at least one identified image, and communicate, via the network interface, the visualized podcast in response to the search request to a user device via the associated computer network.

One non-limiting object of the disclosure is the provision of a method for packaging audio content by an audio content system to facilitate searching and sharing of the audio content. The method comprises a) with a segmentation module, dividing an audio signal of an audio track containing content and having a runtime into at least one audio segment; b) generating an indexed audio segment by associating the at least one audio segment with at least one textual element; and c) pairing at least one visual asset to the indexed audio segment.

Another non-limiting object of the disclosure is the provision of a method for packaging audio content by an audio content system to facilitate searching and sharing of the audio content, wherein the audio track is a podcast.

Another non-limiting object of the disclosure is the provision of a method for packaging audio content by an audio content system to facilitate searching and sharing of the audio content, wherein the segmentation module is configured to divide the audio signal based on the content contained within the audio track.

Another non-limiting object of the disclosure is the provision of a method for packaging audio content by an audio content system to facilitate searching and sharing of the audio content, wherein each audio segment is defined by a start time and end time, each of the start time and end time corresponding to the runtime of the audio track.

Another non-limiting object of the disclosure is the provision of a method for packaging audio content by an audio content system to facilitate searching and sharing of the audio content, wherein the start time and end time of each audio segment is generated by a user via one of a software application and dedicated hardware device.

Another non-limiting object of the disclosure is the provision of a method for packaging audio content by an audio content system to facilitate searching and sharing of the audio content, wherein a voice recognition module is configured to convert the content contained within the audio to an audio text and the segmentation module divides the audio signal into the at least one audio segment based on keywords derived from the audio text.

Another non-limiting object of the disclosure is the provision of a method for packaging audio content by an audio content system to facilitate searching and sharing of the audio content, wherein a voice recognition module is configured to extract keywords directly from the content contained within the audio signal wherein the segmentation module divides the audio signal based on the extracted keywords.

Another non-limiting object of the disclosure is the provision of a method for packaging audio content by an audio content system to facilitate searching and sharing of the audio content, wherein the at least one textual element is one of a keyword, meta-tag, descriptive copy and title.

Another non-limiting object of the disclosure is the provision of a method for packaging audio content by an audio content system to facilitate searching and sharing of the audio content, wherein a voice recognition module is configured to convert the content contained within the audio to an audio text and wherein the at least one textual element is derived from the audio text.

Another non-limiting object of the disclosure is the provision of a method for packaging audio content by an audio content system to facilitate searching and sharing of the audio content, wherein a voice recognition module is configured to extract the at least one textual element directly from the content contained within the audio signal.

Another non-limiting object of the disclosure is the provision of a method for packaging audio content by an audio content system to facilitate searching and sharing of the audio content, wherein the at least one visual asset is one of an image, photograph, video, cinemograph, video loop, and/or collage.

Another non-limiting object of the disclosure is the provision of a method for packaging audio content by an audio content system to facilitate searching and sharing of the audio content, wherein the at least one visual asset is paired with an audio segment based on the at least one textual element associated with the audio segment.

Another non-limiting object of the disclosure is the provision of a method for packaging audio content by an audio content system to facilitate searching and sharing of the audio content, wherein the at least one visual asset is associated with an asset tag, and the at least one visual asset is associated with an audio segment based on a match between the at least one textual element and the asset tag.

Another non-limiting object of the disclosure is the provision of a method for packaging audio content by an audio content system to facilitate searching and sharing of the audio content, further comprising electronically sharing the packaged audio content.

Another non-limiting object of the disclosure is the provision of a method for packaging audio content by an audio content system to facilitate searching and sharing of the audio content, further comprising storing the indexed audio segment in an associated database.

Another non-limiting object of the disclosure is the provision of a method for packaging audio content by an audio content system to facilitate searching and sharing of the audio content, wherein the at least one visual asset is selected from an associated database of stored visual assets.

Another non-limiting object of the disclosure is the provision of a content system for platform-independent visualization of audio content. The system comprises a central computer system comprising i) a processor; ii) a memory in communication with the processor, the memory storing instructions which are executed by the processor; iii) an audio segmenting subsystem including an audio resource containing at least one audio track, the audio segmenting subsystem configured to divide the at least one audio track into at least one audio segment and generate an indexed audio segment by associating the at least one audio segment with at least one audio textual element, wherein the at least one audio textual element relates to a spoken content captured within the audio track; and iv) a visual subsystem including a video resource storing at least one visual asset, the visual subsystem configured to generate an indexed visual asset by associating at least one visual textual element to the at least one visual asset, and wherein the content system is configured to generate a packaged audio segment by associating the indexed audio segment with the indexed visual asset.

Another non-limiting object of the disclosure is the provision of a content system for platform-independent visualization of audio content, wherein the at least one audio textual element and at least one visual textual element is selected from the group consisting of meta tag, keyword, title, and/or descriptive copy.

Another non-limiting object of the disclosure is the provision of a content system for platform-independent visualization of audio content, further comprising a network interface in communication with a network, wherein the network interface is configured to share the packaged audio segment with at least one other device located on the network.

Another non-limiting object of the disclosure is the provision of a system for platform-independent visualization of audio content. The system comprises a central computer system comprising a) a processor, b) a network interface in communication with the processor, and c) memory in communication with the processor, the memory storing instructions which are executed by the processor to i) search for at least one audio track responsive to a search request received via an associated computer network, ii) determine at least one keyword in the at least one audio track from the audio content therein, wherein the at least one keyword is identified via voice recognition, iii) identify at least one visual asset corresponding to the determined at least one keyword in an associated database, and iv) generate a visualization of the audio track utilizing the at least one identified image, and d) communicate, via the network interface, the visualized audio track in response to the search request to a user device via the associated computer network.

These and other advantages will become apparent from the discussion of the distinction between the invention and the prior art and when considering the preferred embodiment shown in the accompanying drawings.

BRIEF DESCRIPTION OF THE DRAWINGS

The subject disclosure may take form in various components and arrangements of components, and in various steps and arrangement of steps. The drawings are only for purposes of illustrating the preferred embodiments and are not to be construed as limiting the subject disclosure.

DETAILED DESCRIPTION

Figure 1:
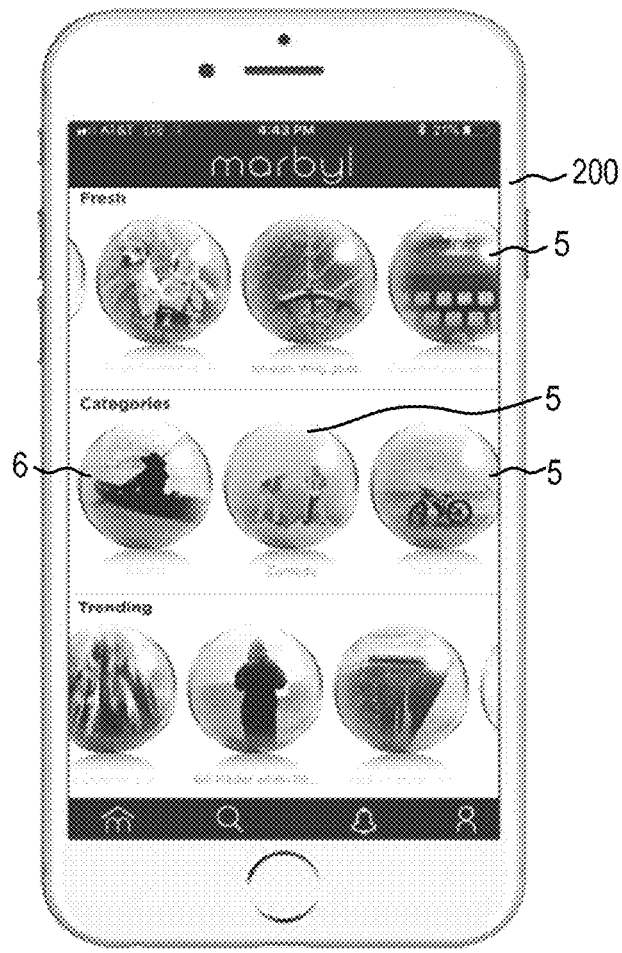
FIG. 1 illustrates an exemplary user device with a home screen display of a software application for searching visual assets associated with an audio segment of audio content in accordance with one embodiment of the subject application

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

The exemplary embodiments are described herein with reference to preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

One or more implementations of the subject application will now be described with reference to the attached figures, wherein like reference numerals are used to refer to like elements throughout.

A visualized audio platform segments digital audio discussion and spoken narrative (audio tracks) into complete thematically unified thoughts, or "audio segments" and matches and/or optimizes those audio segments with meta-tags and/or keyword-rich text based on its core subject. Each enhanced ("indexed") audio segment is then paired with at least one visual asset that complements its core topic, creating a packaged visualized audio segment. Users can search for indexed audio segments associated with a visual asset that are relevant to them, or browse recommended indexed audio segments associated with a visual asset based on the user's interests and/or listening history. "Topical audio segmenting" of audio content may include a human-curated process of identifying themes and/or topic changes within a spoken narrative. Each topical audio segment is associated with a contextually paired visual asset that represents or enhances the topic being discussed during that specific segment of audio narrative. Topical audio segments are distinct elements that can play, link back to that segment of audio within the larger narrative, and connect sponsors and written content to expand and complement the narrative being told in that topical audio segment. In some embodiments, "visualizing" of audio content involves a human-curated process of selecting a particular visual asset to pair with a topical audio segment of audio, more skillfully and intuitively than a computer can. The analysis of thousands of human-curated indexed audio segments associated with visual asset machine learning algorithms allows for the creation of an expert system and the integration of autonomous technology to streamline the segmenting and visualization processes. Accordingly, the visualized audio platform disclosed herein, is the first audio track platform to generate all audio search results in visual form, allow audio track listeners to navigate content in visual form, and make digital audio topics, buried in long-form content, visible to search engines. Text and images are machine readable, whereas digital audio is not. The audio content system described herein sandwiches text and images with audio content for search engines such as Google® to be able to intelligently "see" it, and for advertisers to be able to penetrate it in relevant ways.

In varying embodiments disclosed herein, a platform-independent visualization of audio content system is the first platform to "visualize" audio content. It merges audio content with visual content in a unique way. It creates a new "product" out of digital audio tracks; the first audio platform to work with advertisers on an Adwords-like and keyword bidding system basis; and the first audio platform to make possible for advertisers to pay for visual sponsorship placement on segments of podcast episodes, or full episodes. Furthermore, the platform-independent visualization of audio content system (i.e., the present visualized audio platform) is the first podcast player to make smart use of the screen on all mobile devices, and to allow for direct click-throughs to sponsors or their incentives as they are announced during an episode's host-read audio ad spots.

Figure 2:
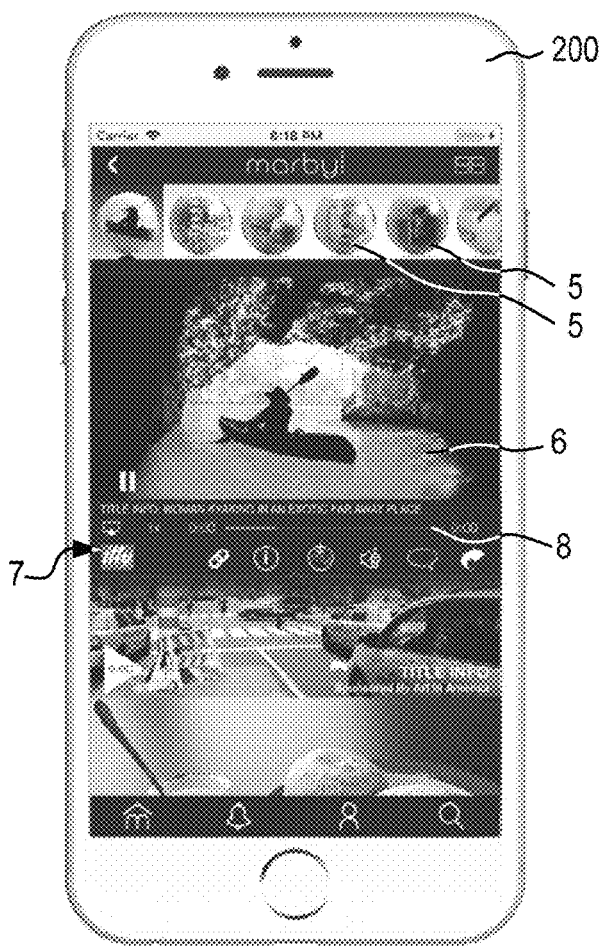
FIG. 2 illustrates an exemplary user device with a home screen display of a software application for playing audio content associated with a visual asset in accordance with one embodiment of the subject application

FIGS. 1-4 and the accompanying description provide a non-limiting overview of an exemplary embodiment of the present visual/audio platform technology and details regarding an implementation of the platform, system and methods will be described in greater detail below. FIGS. 1 and 2 illustrate an exemplary user device, such as a smartphone 200, with a home screen display of a software application for searching visual assets 5 tied to an audio segment of audio content (audio track) in accordance with one embodiment of the subject application. As used herein a "visual asset" is a graphical element including, but not limited to, images, collections of images, videos, and the like. The home screen display presents a plurality of visual assets 5, shown as circular images on the display of the device 200. Users of the platform may scroll through the plurality of visual assets 5 and, upon finding a particular visual asset, e.g., 6, that is appealing, a user may "unwrap" or "play" an associated audio segment 8 (described in greater detail below). That is, a user may select (click or press) a visual asset 6 which opens an audio segment 8 associated with that visual asset 6 inside a media player 7 embedded in an exemplary software platform.

Figure 3:
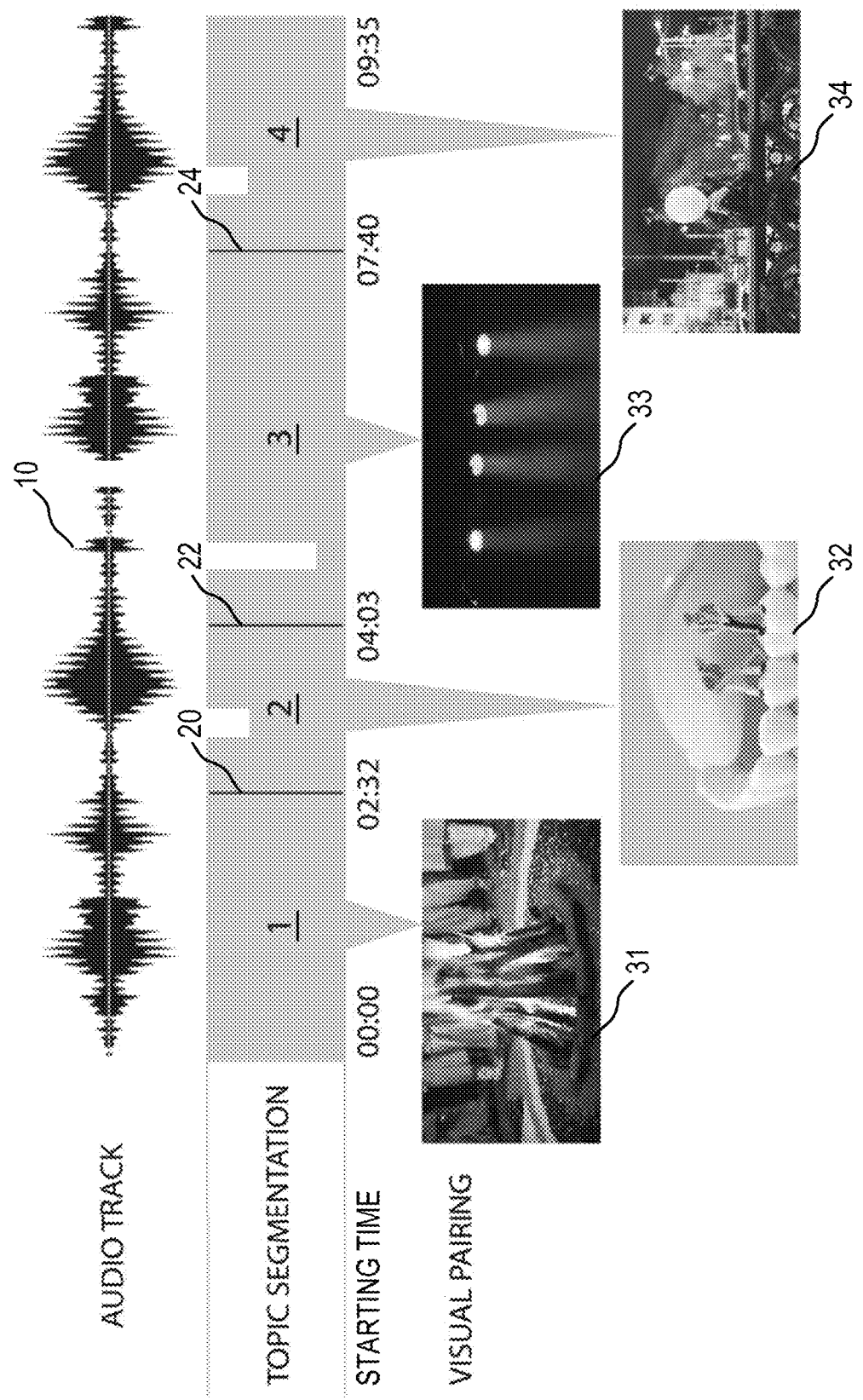
FIG. 3 illustrates an exemplary long-playing audio segment broken down into audio segments in accordance with an exemplary embodiment of the present disclosure.

FIG. 3 illustrates a digital audio track 10 divided into distinct topical audio segments 1, 2, 3, and 4. These audio segments 1-4 correspond directly to each topic transition 20, 22, 24, within the larger narrative. In some embodiments, a curator (administrator, software application, and/or dedicated hardware device) reviews the spoken narrative of a digital audio track recording 10 in its entirety. At each topic transition point 20, 22, 24, the starting time of that segment 1-4 is noted and digitally recorded, for example, as described with respect to Equation 1. In some embodiments, each audio segment, such as exemplary segments 1-4, are defined by time zones between one starting point to the next. These time zones serially flow and provide a recipe for the association and display of contextually relevant visual assets 31, 32, 33, 34. These visual assets 31-34 serve to enhance a corresponding audio segments 1-4 of conversation with a visual match or counterpart. In some embodiments, each visual asset is displayed on a user device, such as smartphone 200 of FIG. 1, and timed to coincide along with the audio discussion taking place. It is to be understood that the images associated with visual assets 31-34 are non-limiting, and that any image or graphical element may be used as a visual asset. In some embodiments, audio segments, for example, audio segment 1, relate closely with other audio segments (e.g., audio segment 3 within the same audio track recording 10) such as when the thought on a subject discussed within the digital audio track is "circled back to" and completed at a later time. Audio segments of this nature are "grouped" and considered part of a "bag" of audio segments. Audio segments that are part of a "bag" may be saved and/or shared, for example in a social network, independently or as a group.

In some embodiments, a human curator may note and/or record secondary "in" and "out" points on an audio segment 1-4, as well as ascribe "fade in" and/or "fade out" transitions on any "audio segment's" "secondary" version. These "secondary" versions offer a smoother listening experience when the audio segment 1-4 is heard out of context with its surrounding recording—as in when discovered through a preferred application having a Home page, Search function, or Share feature—eliminating sound disturbances, breaths, swallows, pauses, "overtalking" of two or more people, or anything else determined to diminish its strength potential and/or contextual "completeness" when heard independently and out of original context.

Figure 4:
FIG. 4 illustrates an exemplary embodiment of a plurality of visual asset thumbnails that are associated with exemplary audio segments.

Tying visual assets, such as visual assets 31-34 to audio segments, such as segments 1-4, is advantageous for users in searching and finding desired audio content. FIG. 4 illustrates an exemplary embodiment of a plurality of visual asset thumbnails 40 that are associated with audio segments (such as segments 1-4 of FIG. 3) of an exemplary digital audio track (such as audio track 10 of FIG. 3) about "our relationship with food." A listener/user may become intrigued by a particular visual asset, for example the French fries/nails image 41, and select it within an associated software platform/search engine. The selection may be made by a user input device of an associated computer system or mobile computer device, for example a computer mouse or touch screen as described in detail below with respect to FIGS. 5-6. The selection of a thumbnail, such as thumbnail 41, starts the process of a user "going down the rabbit hole" as afforded by the associated software platform's search and discovery functionality. After the selection of visual asset thumbnail 41, the listener/user is presented, within the platform, a whole new grouping of audio segments represented by associated visual assets 50. For example, in selecting the French fry/nails image 41 of the audio track about "our relationship with food," the listener/user is presented with visual assets of audio segments on the subject of "food and consequences". That is, the user is presented with the exemplary grouping of visual assets 50, imagery related to discussions in audio form on, for example, the topics of gluten and its effect on our health 51, fast food 52, refined sugar and diabetes 53, cholesterol management 54, and whether or not to eat meat 55. In other words, the user of the software platform has the option to explore related information, audio and visuals, in such a manner, selecting visual assets associated with an audio segment, that he/she has discovered in order to preview it, and then from preview mode he/she may opt to select it one more time in order to hear the audio content "behind" it, at which point that audio then overrides the audio he/she has been listening to as he/she took the journey he/she just did to arrive at the new audio. In some embodiments, a user also has the option to "bookmark" content as he/she finds it that he/she would like to listen to later, without having to override the audio he/she is listening to at the time. The more a listener listens, and the more things he/she bookmarks, the more a learning algorithm, embedded in the software platform, learns about the listener's behaviors and/or interests. The learning algorithm may then generate suggested content for the listener in an intelligent way.

According to another embodiment, the visualized audio content platform is able to expand the reach of audio content because of its extraction of topics from within long-form audio track. As an example, in light of an upcoming major sporting event, the host of a sports podcast decides to, thirty minutes into his show, share some tips on how to prepare the chicken wings. The system 100, described in greater detail below, separates out the dialogue regarding the preparation of chicken wings, defining it as a stand-alone "topical audio segment". A visual asset related to food is tied to the topical audio segment. The packaged visual asset and chicken wing audio segment are presented as a package to users on a software platform. A person that is interested in food, but not sports, is now able to search, find and listen to the chicken wing audio segment, and likely would have never stumbled upon the chicken wing recipe but for receiving through a social share or web search of this chicken wing audio segment, extrapolated contextually from the audio show (podcast) that "housed" or "hid" it.

Figure 5:
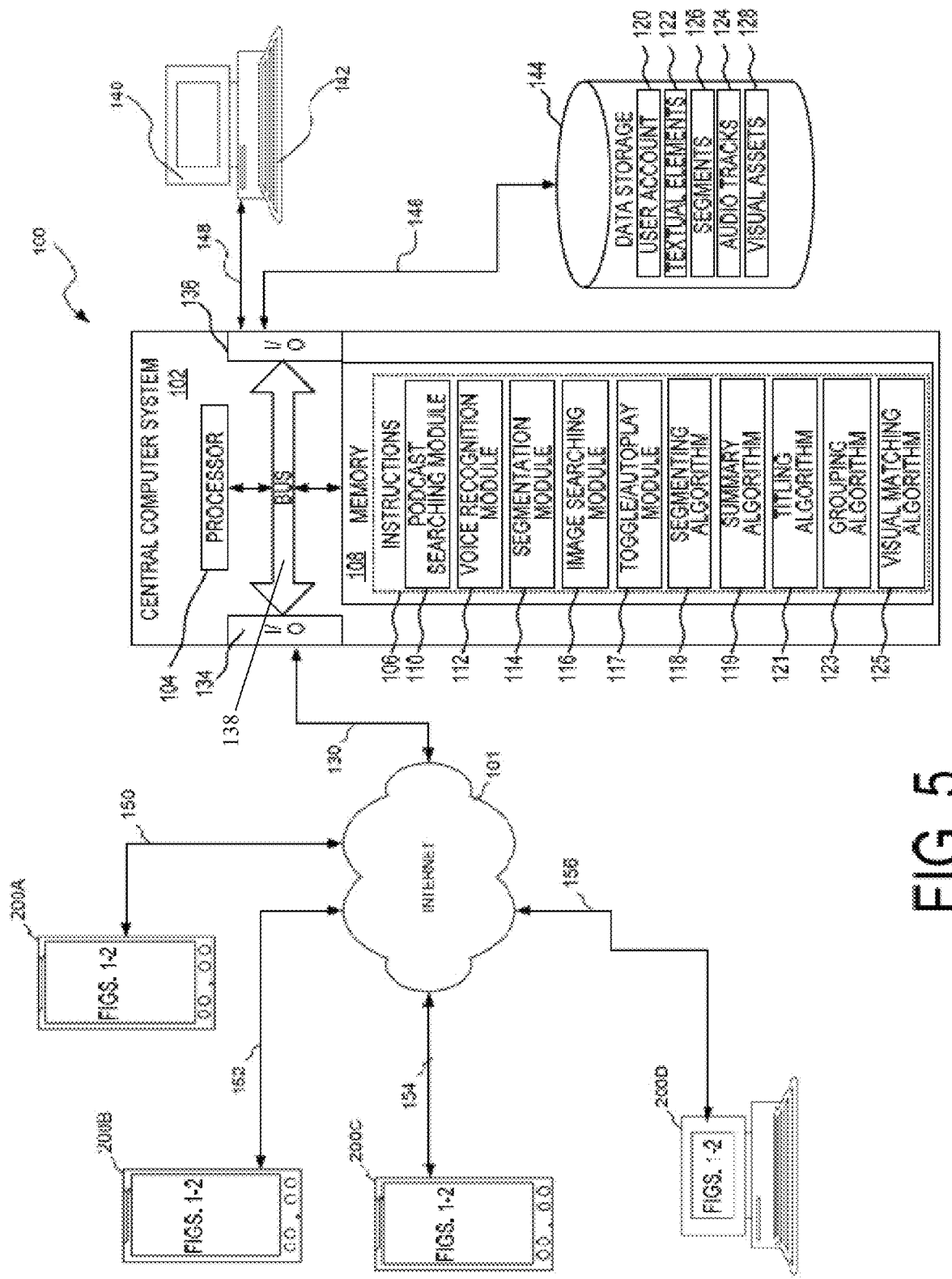
FIG. 5 is a functional block diagram of a system for platform-independent visualization of audio content in accordance with one aspect of the exemplary embodiment.

Referring now to FIG. 5, there is shown a system 100 configured for providing platform-independent visualization of audio content. As used herein, "platform-independent" means that the platform may be adopted for use across different and/or multiple platforms and/or operating systems as known by those of skill in the art. It will be appreciated that the various components depicted in FIG. 5 are for purposes of illustrating aspects of the exemplary embodiment, and that other similar components, implemented via hardware, software, or a combination thereof, are capable of being substituted therein.

As shown in FIG. 5, the system 100 includes a central system represented generally as the central computer system 102, which is capable of implementing the exemplary method described below. The exemplary computer system 102 includes a processor 104, which performs the exemplary method by execution of processing instructions 106 that are stored in memory 108 connected to the processor 104, as well as controlling the overall operation of the computer system 102.

The instructions 106 include a podcast searching module 110 configured to receive, keywords and associated information to conduct a search for audio tracks 124 (e.g., podcasts) corresponding to a search request received from an associated user of the user devices 200A-200D. It will be appreciated by those skilled in the art that the term "podcast" as used herein includes, without limitation, a digital audio file made available on the Internet for downloading to a computer or mobile device, typically available as a series, new installments of which can be received by subscribers automatically. However, the skilled artisan will understand that other audio content is also capable of being utilized by the system 100 described herein, including, for example and without limitation, user-generated self-records, audiobooks, streaming/digital radio, music, virtual reality, audio visualization software and systems, and the like. Accordingly, the audio content system 100 enables the creation of storytelling goggles or podcast goggles (e.g., virtual reality or streaming audio) that brings visualization of audio to life in a novel manner, as well as the compositing of complete, indexed visual asset associated with an audio segment created from user-contributed self-recordings, affecting visualization software and licensing, as well as audio visualization training systems and products.

The instructions 106 also include a voice recognition module 112 that, when implemented by the processor 104, facilitates the identification of textual elements 122 associated with the audio of a selected audio track 124 (e.g., podcast). According to one embodiment, the voice recognition module 112 utilizes proprietary algorithms to identify keywords recited in the audio track 124. In other embodiments, the voice recognition module 112 utilizes suitable proprietary or commercially available speech recognition products, utilizing acoustic and/or language modeling (e.g., document classification or statistical machine translation), including for example and without limitation, algorithms, engines and/or software provided by Nuance®, Microsoft®, Apple®, Google®, and the like.

In addition, the instructions 106 include a segmentation module 114, which when executed by the processor 104, facilitates the segmentation of an audio track 124 into a plurality of topical audio segments or chapters. In accordance with one embodiment, the segmentation module 114 divides audio tracks 124 into one or more segments, i.e., chapters, denoting some transition between portions of the audio of the audio track 124, e.g., changes in topics or themes, etc. For example, a sports-based audio track 124 (e.g., podcast) may be segmented into different chapters, e.g., baseball, basketball, football, soccer, and/or different professional or collegiate teams within that sport. It will be appreciated that this segmentation of the audio track 124 may, accordingly, be accompanied by corresponding images 128 associated with each chapter, i.e., sport and/or team. Further discussion of the segmentation of an audio track 124 in accordance with the systems and methods set forth herein are discussed below.

The segmentation module 114 is configured to divide an audio signal, such as audio track 10 of FIG. 3, representing an audio track 124 or the like, into smaller segments, such as exemplary segment 1. Each segment 1 encapsulates a distinct conversation topic and/or complete unitary thought. The input for the segmentation module 114 is one audio track 124 (podcast and the like) while the output is at least one segment. In some embodiments, the audio track is input into a segmentation algorithm and the output is a list of pairs, wherein each pair contains the start time and end time of each segment. In Equation 1 below, a segment s0, is defined as the start time s0_start and end time s0_end.

$$\text{Output\_example} = \{[s0\_start, s0\_end], [s1\_start, s1\_end], \ldots [sn\_start, Sn\_end]\} \quad \text{Equation 1:}$$

In some embodiments, at least one curator reviews the audio track and defines a start time and end time of audio segments, noting the transition time of each, i.e., defining the list of start time—end time pairs. A curator may be a human curator, algorithmic, dedicated hardware components, software components or a combination of on any or all of the above. In other embodiments, segments 1-4 are determined by a segmenting algorithm 118 (e.g., a learning algorithm) stored in a data storage or memory 108. In some embodiments, a training dataset is provided. That is, input signals (audio tracks 10) are provided in a data storage which are indexed by a curator. In the case of a human curator, it is generally more preferred to have multiple curators review and label the same audio track because text interpretation is subjective.

In some embodiments, the segmenting algorithm 118 is a Recurrent Neural Network (RNN). RNNs are generally used for processing speech and text as RNNs are efficient for processing time-series data. RRN is used to extract raw speech data or text from the audio track and find dependencies between phonemes and/or words and use such correlations to form smaller signals or texts, each representing a segment 1.

In other embodiments, the segmenting algorithm 118 is a Convolution Neural Network (CNN). CNNs are a class of neural networks often used in image processing and 2D vector process. Spectrograms of the raw audio signal are calculated in order to form a suitable input for the CNN. The spectrogram is a matrix with time and frequency axes. The CNN uses this input to learn where new topics begin and end, thus defining a segment.

In still other embodiments, the segmenting algorithm 118 is a Hidden Markov Model (HMM). HMM is a statistical and probabilistic graphical model. It is represented by a graph of states, where the learned process aims to find the state transition probabilities. It is to be understood that any of the above learning algorithms or a combination of segmenting algorithms 118 may be used to process the audio track, such as audio track 10.

In accordance with another exemplary embodiment, the segmentation module 114 is further configured to enrich each audio segment 126 with at least one textual element 122 and may work in concert with a voice-recognition module 112. In some embodiments, the textual element 122 is at least one meta-tag and/or keyword. In other words, the audio segments are tagged with relevant descriptors. In some embodiments, the tag is selected (by a curator or computer algorithm) from a predefined database of textual elements 122 located in an associated data storage 144. In other embodiments, a tag is generated based on content of the associated audio content whether or not the keyword/tag is predefined and/or located within the database.

In some embodiments, the textual element 122 is a short summary, i.e., "a descriptive copy". That is, the textual element 122 may be a short textual summary of the discussion contained within the audio segment. In some embodiments, the descriptive copy of the topic is provided by a human curator and associated with the audio segment and stored in the data storage 144. In other embodiments, the audio track is input into a summary algorithm 119 and the output is a descriptive copy (summary). In some embodiments, the descriptive copy is created directly from speech extracted from the audio track. In other embodiments, the speech of the audio track is converted to text and a descriptive copy (summary) is generated from the converted text.

In some embodiments, a summary algorithm 119 for creating a descriptive copy includes an RNN. The RNN can include an encoder and decoder. The encoder is an RRN that receives and processes words so as to identify dependencies between words and make the context of words. The decoder is an RNN that generates text from values obtained from the encoder.

In some embodiments, the textual element 122 is a title. The title may be defined by a curator (human, software, hardware, or a combination thereof) during the review of the audio track 10 for segmentation. In some embodiments, the segmentation module 114 alone or in concert with the voice recognition module 112 is (are) further configured to provide a title to the audio segment via a title algorithm 121 stored in memory 108. Input for the titling algorithm 121 is an audio signal, such as audio signal 10, and the output is text that represents a sequence of titles for each word/sentence in the speech. In some embodiments, the titling algorithm 121 is an HMM.

It is to be appreciated that any combination and number of textual elements 122 may be associated with an audio segment. For example, an audio segment may be associated with a title, descriptive copy, and at least one keyword and/or meta tag. After the segmentation module 114 has segmented an audio track and indexed the audio segment with at least one textual element 122, the indexed audio segment is stored in a data storage 144. In some embodiments, the indexed audio segment is transferred to a Final Audio Database (FADB), described below in relation to FIG. 8. After being placed in the data storage 144, audio files representing topical audio segments are selected and paired with at least one visual asset stored in an associated data storage 144.

In some embodiments, the visual assets 128 are stored in a Final Visuals Database (FVDB), described below in relation to FIG. 8. The visual assets may be paired by the image-searching module 116, by either a human action or automatically by an algorithm. That is, the instructions 106 resident in memory 108 and executable by the processor 104 further include an image-searching module 116. The image searching module 116 and a voice recognition module 112 thereafter work in concert, via the processor 104, to search for visual assets 128 stored in data storage 144, that correspond to the textual element 122 (e.g., keyword) recognized by the voice recognition module 112 from the audio track 124. As discussed in greater detail below, the visual assets 128 may be retrieved from publicly accessible sources, from proprietary sources, from images previously accessed and stored in associated storage, received from the broadcaster associated with the selected audio track 124, or the like. Additional information relating to the searching for images performed by the image searching module 116 are discussed in accordance with the exemplary embodiments set forth below.

In some embodiments, the image searching module is configured to execute a visual matching algorithm 125 that can suggest a visual asset 128 that is relevant to a textual element 122 of and audio segment 126. The visual matching algorithm 125 may use a Named Entity Recognition algorithm that extracts a textual element and develops a pairing based on the extracted content. The visual matching algorithm 125 may incorporate a NER system (New Enhancement Recognition System). In some embodiments, the visual matching algorithm 125 may include AI for removing duplicate and watermarked images. In some embodiments, the visual matching Algorithm 125 utilizes a Text Semantic Similarity Neural Network based on natural language understanding.

A visual asset 128 may be any form of visual information, such as an image or photograph. In some embodiments, the visual asset 128 paired with the indexed audio segment 126 is a cinemograph. Briefly, a cinemograph is a photograph in which a minor and repeated movement occurs, forming a short video clip. These are generally published as an animated GIF or other video formation and give the illusion that the viewer is watching an animation. In some embodiments, the image-searching module 116 is further configured to create a cinemograph from visual assets 128 (images and/or videos) stored in data storage 144. That is, a cinemograph is generated based on tags, topics, and/or summaries obtained from an indexed audio segment 126. In some embodiments, a user may provide a description that will lead to the animation of a certain part of an image or video according to the user description. The user description can also be used to generate new cinemographs based on existing resources. The process starts with the recognition of objects based on a description in images and/or videos and follow with use of the selected image(s)/video(s) to produce cinemographs.

In some embodiments, the visual asset 128 paired with the indexed audio segment 126 is a video loop. A video loop is generated from a video, differently from a cinemograph which is something between an image and/or video. That is, in a cinemograph only a certain part of the image is animated; in a video loop, the goal is to animate/loop the entire scenery. The video is generated from tags, topics, summaries, user description and/or other videos.

In some embodiments, the visual asset 128 paired with the indexed audio segment 126 is a collage. That is, the image-searching module 116 is further configured to create a collage image from visual assets 126 (images and/or videos stored in database 144), based on tags, topic names, summaries, and/or user explanations/descriptions. Images and/or videos used for generating a collage can be backgrounds, styles, single objects, etc. Generative models may be used to combine images and/or video. An algorithm may be designed to use only parts of images or whole images and then combine them into a new collage image. In some embodiments, an Attentional Generative Adversarial Neural Network (GAN) is used to generate a collage. The Attentional GAN automatically retrieves the words, represented by word vectors for generating different sub-regions of the image. Deep Attention Multimodal Similarity Model provides the fine-grained image-text matching loss function for the generative network. The DAMAM is comprised of two neural networks, one that maps the sub-regions of the image and the other that maps the words of the sentence, co-common semantic space, by measuring the image-text similarity at the word level to computer mentioned fine-grained loss function for the image generation.

Figure 9A:
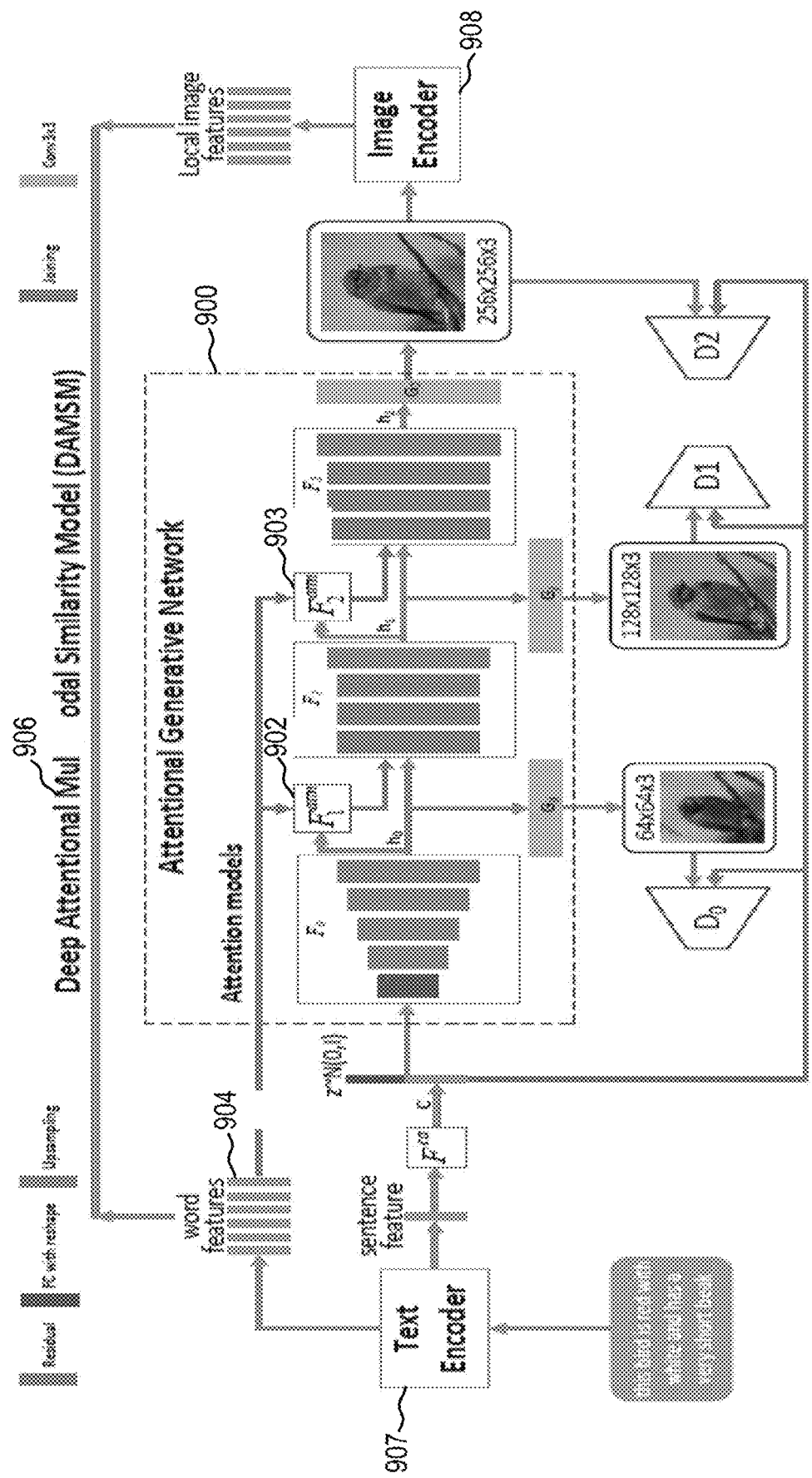
FIG. 9A illustrates an exemplary architecture of a preferred Attentional Generative Adversarial Neural Network in accordance with the present disclosure.
Figure 9B:
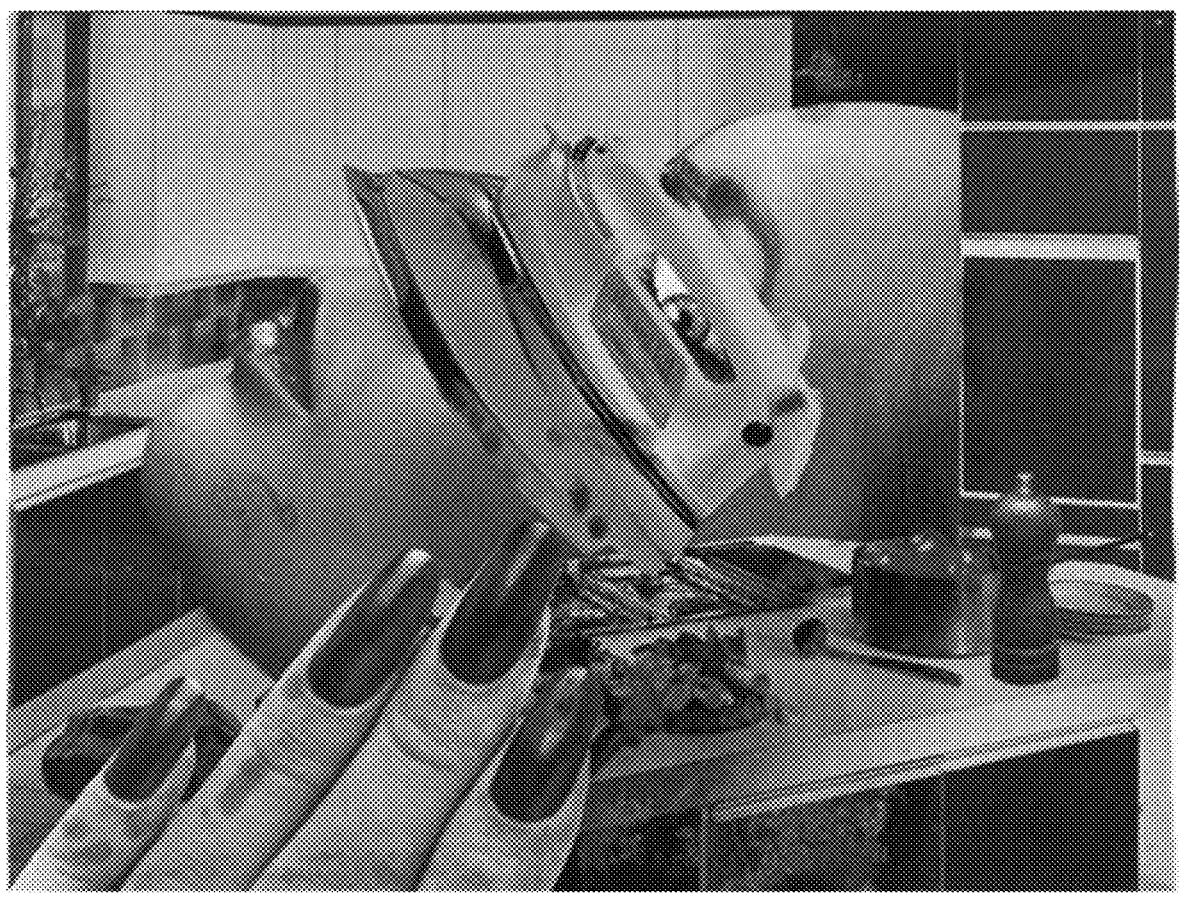
FIG. 9B is an exemplary collage visual asset in accordance with the present disclosure.

FIG. 9A illustrates an example of the architecture of a preferred Attentional Generative Adversarial Neural Network 900. Each attentional model 902, 903 automatically retrieves the words, represented by word vectors 904 (embeddings—a method used to represent discrete variables as continues vectors), for generating different sub-regions of a collage. The Deep Attentional Multimodal Similarity Model 906 provides the fine-grained image-text matching loss function for the generative network 900. The DAMSM 906 is composed of at least two neural networks, one that maps the sub-regions of the image and the other maps the words of the sentence to a common semantic space by measuring the image-text similarity at the word level to computer mentioned fine-grained loss function for the image generation. In some embodiments, a text encoder 907, similar or the same as the Recurrent Neural Network, is used to generate a descriptive copy. The image encoder 908 is preferably a Convolutional Neural Network for generating an image. FIG. 9B is an exemplary collage created via the Attentional Generative Network 900. In some embodiments, Computer Vision is used to segment an image. In Computer Vision, image segmentation is the process of portioning a digital image into multiple segments. The segmentation is performed to simplify and/or change the representation of an image into something that is more meaningful and/or easier to analyze. In some embodiments, image segmentation is used for object extraction and those extracted objects are used to generate portions of a collage.

In some embodiments, the audio segments 126 associated with visual assets 128 are grouped into "bags," as briefly discussed above. In other words, after segmentation and tagging, a grouping algorithm 123 is used to find intersections between indexed audio segments 126 using applied tags. In some embodiments, the grouping algorithm 123 is a K-means Algorithm. K-Means is a clustering algorithm, and in this case, each word or text is represented by a vector. To group words or texts, K-Means algorithm finds similarities between vectors using Euclidean distance or another distance method known in the art. In other embodiments, the grouping algorithm 123 is a Support Vector Machines Classification algorithm (SVMC). The SVMC uses "bags" as classes and/or labels for those bags to determine if an indexed audio segment belongs to a specific bag.

The instructions 106 also include a toggle/auto-play module 117 which operates to combine together a long-running play of content from amongst a variety of segments 126 from disparate audio tracks, such as audio tracks 124 based upon textual elements 122 (e.g., keywords) input by an associated user. It will be appreciated that because the audio of the audio tracks 124 has been segmented into specific topics and/or themes of discussion, users' search results by keyword or phrase are able to provide highly relevant sound bites extracted from a multitude of shows and/or episodes. Accordingly, such a module 117 does not require the listener to listen to any one full episode of any show to arrive at their search term point of deepest interest. This also means that the system 100 may "string" together for autoplay, not full episodes (audio tracks 124), but audio segments 126, based on a user's keyword search terms. These audio segments 126 may autoplay for a listener who'd like to, for example, hear what twenty different podcast show hosts and/or guests have to say specifically on the subject of "building a house", knowing that as the user is listening, the user has the ability to bookmark or favorite any segment 126 in passing, perhaps to follow the host or show behind it, and may also expand out the full episode of any one such "teaser" in passing. According to one embodiment, the toggle/auto-play module may stitch together a full podcast episode from amongst a variety of segments 126 from disparate audio tracks 124 based upon textual elements 122 (e.g., keywords) input by an associated user. In such an embodiment, the system 100 may "stitch" together, not full episodes (audio tracks 124), but audio segments 126, based on a user's keyword search terms. Thereafter, the stitched-together segments 126 may autoplay for a listener as described above, thereby allowing the listener to listen to an audio track 124 comprised of only the segments 126 of interest.

The various components of the computer system 102 associated with the central system 101 may all be connected by a data/control bus 138. The processor 104 of the computer system 102 is in communication with an associated data storage 144 via a link 146. A suitable communications link 146 may include, for example, the public switched telephone network, a proprietary communications network, infrared, optical, or other suitable wired or wireless data communications. The data storage 144 is capable of implementation on components of the computer system 102, e.g., stored in local memory 108, i.e., on hard drives, virtual drives, or the like, or on remote memory accessible to the computer system 102.

The associated data storage 144 corresponds to any organized collections of data (e.g., account information, images, videos, usage rights, copyright instructions, segments, podcasts, user device information, etc.) used for one or more purposes. Implementation of the associated data storage 144 is capable of occurring on any mass storage device(s), for example, magnetic storage drives, a hard disk drive, optical storage devices, flash memory devices, or a suitable combination thereof. The associated data storage 144 may be implemented as a component of the computer system 102, e.g., resident in memory 108, or the like.

In one embodiment, the associated data storage 144 may include data corresponding to user accounts 120, textual elements 122, audio tracks 124, audio segments 126, visual assets 128, and/or other corresponding data, e.g., website data hosted by the central computer system 102, URLs of podcasts, and the like. The user account information 120 may include, for example, username, billing information, device 200A-200D identification, address, passwords, and the like. Such user account information 120 may be collected by the central computer system 102 during user registration of a user device 200A, 200B, 200C, 200D, as will be appreciated by those skilled in the art. The data storage 144 may include data relating to image rights, for example, instructions on the number of reproductions to be made, the cost associated with reproducing the corresponding visual asset 128, ownership of the copyright of the visual asset 128, watermarks or attribution information, any myriad additional information relating to the transfer, usage, sale, authorship, and the like relating to a corresponding visual asset 128. According to another embodiment, the visualized audio platform is equipped to collect more extensive personal information about each user than is typically collected through traditional players, offering users the ability to create their own profiles and answer questions relating to their interests, to create a more tailored suggested content experience for users.

The computer system 102 may include one or more input/output (I/O) interface devices 134 and 136 for communicating with external devices. The I/O interface 136 may communicate, via communications link 148, with one or more of a display device 140, for displaying information, such estimated destinations, and a user input device 142, such as a keyboard or touch or writable screen, for inputting text, and/or a cursor control device, such as mouse, trackball, or the like, for communicating user input information and command selections to the processor 104. The I/O interface 134 may communicate, via communications link 130, with external devices 200A, 200B, 200C, 200D via a computer network, e.g., the Internet 101.

It will be appreciated that the platform-independent visualization of audio content system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 5 as a networked set of components, the system and method are capable of implementation on a stand-alone device adapted to perform the methods described herein.

The central computer system 102 may include a computer server, workstation, personal computer, cellular telephone, tablet computer, pager, combination thereof, or other computing device capable of executing instructions for performing the exemplary method.

According to one example embodiment, the central computer system 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 134, 136 allow the computer to communicate with other devices via a computer network, and may comprise a modulator/demodulator (MODEM). Memory 108 may store data processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method set forth hereinafter.

As shown in FIG. 5, one or more user devices 200A, 200B, 200C, and 200D may be in communication with the central computer system 102 via respective communication links 150, 152, 154, and 156, utilizing a computer network 128, e.g., the Internet. In one embodiment, each user device 200A, 200B, 200C, 200D may be implemented as a smartphone employing an operating system such as iOS, ANDROID, BLACKBERRY, WINDOWS, APPLE, CHROME, or the like. The user devices 200A-200D are representative of any personal computing devices, such as personal computers, netbook computers, laptop computers, workstation computers, personal data assistants, web-enabled cellular telephones, tablet computers, proprietary network devices, or other web-enabled electronic devices. The data communications links 150-156 between the central computer system 102 and the user devices 200A-200D may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the user devices 200A-200D may communicate with the central computer system 102 via a cellular data network.

Figure 6:
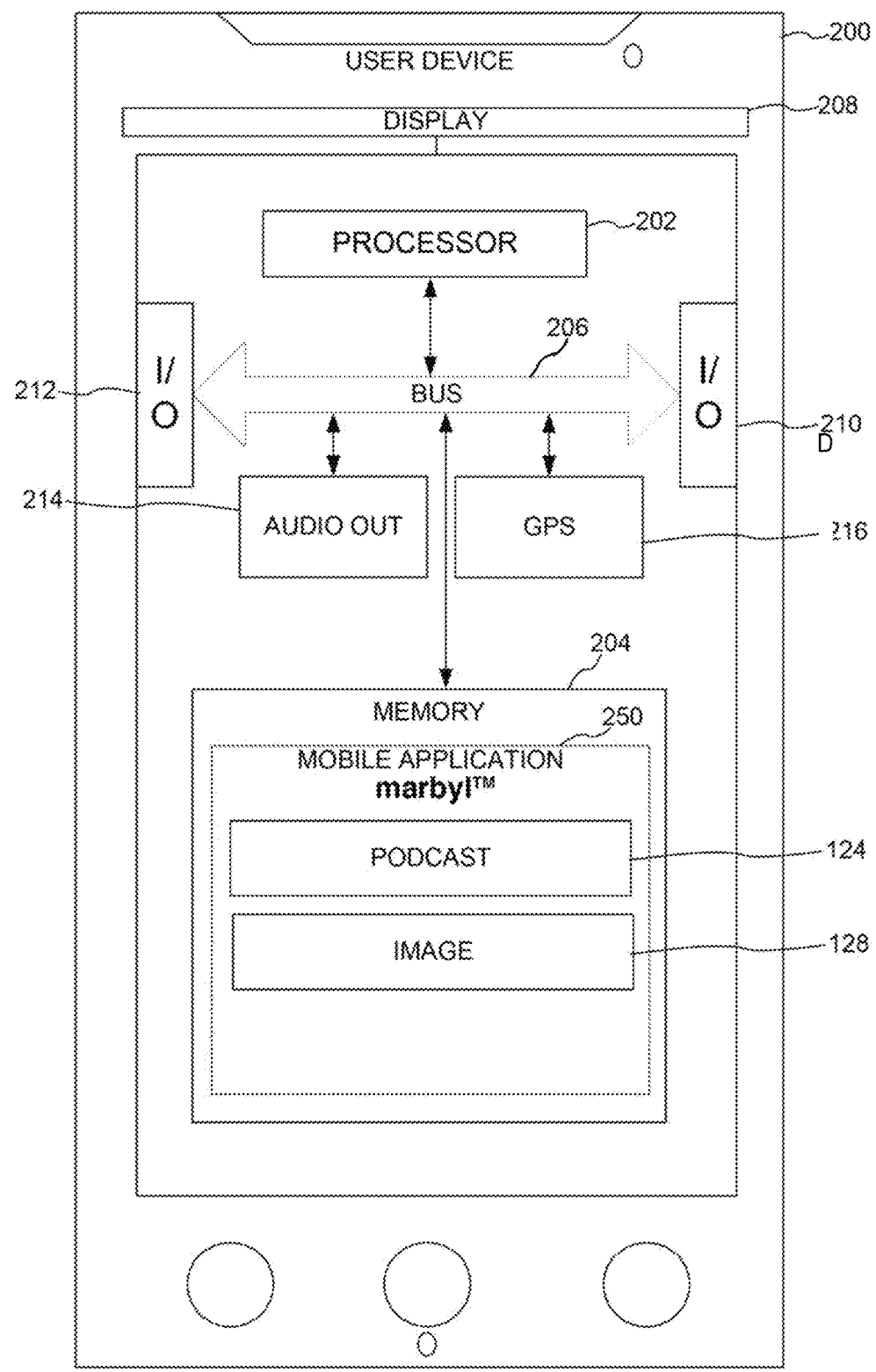
FIG. 6 is a functional block diagram of a user device for platform-independent visualization of audio content in accordance with one aspect of the exemplary embodiment.

FIG. 6 provides an example illustration of a user device 200 representative of the user devices 200A-200D depicted in FIG. 5. It will be appreciated that the image presented in FIG. 6 is representative of any suitable personal computing device known in the art capable of providing a user with access to the Internet and/or the ability to play podcasts. Accordingly, while depicted in FIG. 6 as a representative mobile device, any personal computing device may be utilized in accordance with the systems and methods set forth herein. The user device 200 may include a processor 202, which executes one or more instructions or applications 250 in the performance of an exemplary method discussed below. In accordance with one embodiment, the application 250 includes a multimedia player, capable of playing audio tracks 124 with visualization as set forth herein, including, for example the MARBYL™ player/platform of Tree Goat Media, LLC™. It will be appreciated that the application 250 may be platform independent, e.g., adapted for use across different platforms/operating systems, as will be understood by those skilled in the art. The user device 200 may further include a memory 204 storing the application 250 in data communication with the processor 202 via a system bus 206. The processor 202 of the user device 200 may be in data communication with the central computer system 102 via an I/O interface 212 or I/O interface 210. The user device 200 may further include a display 208 suitably configured to display data to an associated user, receive input from the associated user, and the like. In some embodiments, for example, when part of a mobile device or tablet, the display 208 of the user device 200 may be configured as a touch-screen display capable of receiving user instructions via user contact on the display, e.g., LCD, AMOLED, LED, RETINA, etc., types of touch-screen displays. Alternatively, when the user device 200A-200D is implemented as a desktop or laptop computer or smart TV, the I/O interface 212 or 210 may be coupled to an input device (keyboard/mouse/touchpad/remote), as well as an output device, e.g., a display (monitor), speakers, and the like.

The memory 204 may represent any type of non-transitory computer readable medium such as random access memory (RAM), read only memory (ROM), magnetic disk or tape, optical disk, flash memory, or holographic memory. In one embodiment, the memory 204 comprises a combination of random access memory and read only memory. In some embodiments, the processor 202 and memory 204 may be combined in a single chip. The input/output interface(s) 210, 212 allow the mobile device 200 to communicate with other devices via a communications network, via Universal Serial Bus or Lightning® ports, via wired or wireless connections, and may comprise a modulator/demodulator (MODEM). Memory 204 may store data processed in the method as well as the instructions for performing the exemplary method. The digital processor 202 can be variously embodied, such as by a single core processor, a dual core processor (or more generally by a multiple core processor), a digital processor and cooperating math coprocessor, a digital controller, or the like.

The memory 204 of the user device 200 includes the application 250 communicated from the central computer system 102 during registration of the user device 200, and creation of the user account 120. The application 250 stored in memory 204 may be made available via a third-party service, e.g., GOOGLE PLAY, ITUNES, MICROSOFT, or the like. The user device 200 may be configured to further store one or more audio tracks 124 received from the central computer system 102 responsive to search or from a podcast hosting site independent of the central computer system 102, as well as any images 128 associated with the audio tracks 124 received from the central computer system 102, or the like. The user device 200 further includes an audio output component 214. It will be appreciated that the audio output component 214 is capable of outputting, via an integrated speaker of the user device 200 or via a suitable audio connection, a broadcast of an audio track 124 to the associated user in conjunction with the images 128 associated therewith.

As shown in FIG. 5, the user devices 200A-200D are capable of intermittent (opportunistic) or continuous bi-directional communication with the central computer system 102 utilizing the I/O interface 212. In one embodiment, for example when the user device 200 is implemented as a mobile device, the bi-directional communication is data communication utilizing a cellular data network, e.g., $3^{rd}$ generation mobile phone standards (3G), $4^{th}$ generation standards (4G, 4G LTE, WiMax), $5^{th}$ generation standards (5G, 5GE), EV-DO, standalone data protocols, and the like. The user device 200A-200D may provide account information 120 to the central computer system 102 during registration therewith. The central computer system 102 may then register the user associated with the user device 200A-200D. The user device 200 depicted in FIG. 6 further includes a global positioning system ("GPS") component 216 for determining location of the user device 200A-200D as will be understood in the art. In accordance with one embodiment, the GPS (or other suitable location data) may be communicated to the central computer system 102 for use in determining appropriate images 128, topics, themes, etc., or myriad other customizations of a visualized audio track 124 to be returned to the user device 200A-200D.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

In accordance with one exemplary embodiment, the platform-independent visualization of audio content system 100 moves beyond the current text-based search limitations and employs visuals to effectively mine audio. The platform-independent visualization of audio content system 100, i.e., the audio content system, extracts audio out of search engine invisibility via visual assets in trending formats that have the highest engagement rates in social media. The audio content system is characterized by visual assets, a descriptive copy, and tags that make its audio content understandable and readable inside the search engines.

According to another embodiment, the platform-independent visualization of audio content system 100 described herein presents curated visual assets that enhance or mirror spoken narrative at each point of topic change within audio. Mostly motion photographs, these visuals are like choreographic counterparts to the audio's underlying discussion. The system 100, i.e., the audio content system, via the segmentation module 114 or other suitable component, transforms audio tracks, e.g., audio tracks 124, into "chapters" or "audio segments" 126, whereby topical changes in dialogue are determined and marked on a timeline, and visual assets 128, and at least one textual element 122 such as a descriptive copy, tag, keywords and the like stored in data storage 144 are then selected, written, attributed, and attached to the audio segments 126. Audio segments 126 may be combined, via the toggle/auto-play module 117, together serially and/or visually as topic-based storyboards that are synchronized with audio timing. The audio content system 100 provides audio with a second and third storyline. There is the audio storyline, which is then given a layer of visual storytelling, and then a layer of titling and descriptive copy.

According to another embodiment, as a result of the audio in the audio track 124 being "topic segmented" via the segmentation module 114 into specific topics and/or themes of discussion, an associated users' search results by keyword or phrase are able to provide highly relevant sound bites extracted from a multitude of shows and/or episodes, and does not require the user to have to listen to any one full episode of any show to arrive at their search term point of deepest interest. Furthermore, the toggle/auto-play module 117 enables the audio content system 100 to combine or stitch together, not full episodes, but topical audio segments 126, based on keyword search terms of the associated user. These combined audio segments 126 may autoplay for a user who'd like to, for example, sit back and hear what twenty different podcast show hosts and/or guests have to say specifically on the subject of "building a house", knowing that as the user is listening, the user has the ability to bookmark or favorite any segment in passing, perhaps to follow the host or show behind it, and may also expand out the full episode of any one such "teaser" in passing.

According to another embodiment, there is provided a method for dissecting long-form digital audio content such as audio track 124 into short form digital audio content, such as segments 126 by way of curation. A single audio segment 126 that is extracted from long-form (audio track 124, e.g., podcast) represents a "complete thought, concept, theme, or topic" in a spoken narrative. That is, the content can "stand alone" from the long-form audio and be comprehensible as a "complete thought, concept, theme, or topic" although pulled outside of the overall context from which it was extracted.

According to another exemplary embodiment, there is provided a method for segmenting and visualizing audio through a curatorial selection and/or decision-making process including, but not limited to, marking topic change points in dialogue, selecting visual assets 128 that most appropriately match and/or enhance that dialogue, and copyrighting and/or tagging to enhance segment interaction and improve segment Search Engine Optimization (SEO) and/or social sharing "packaging". In some embodiments, a human curator listens to the audio track and selects the appropriate time zones to define audio segments 126. In some embodiments, a human curator is aided by an AI Assistant of the segmentation module 114 that proposes audio segment cut points (e.g., 20, 22, and 24 of FIG. 3) to speed up the segmentation process. In some embodiments, the AI Assistant of the segmentation module 114 is also configured to suggest titles through an audio track. In this way, a segmentation algorithm (such as segmentation algorithm 118) is able to learn from a human curator alterations to AI suggestion so that the AI may become "smarter". In other embodiments, a computer Artificial Intelligence algorithm is configured to define the audio segment 126 without any human intervention or assistance.

According to another embodiment, there is provided a system for providing digital audio the requisite web tools to effectively enable digital advertising on this media. The audio content system 100 of the present disclosure, enables advertisers to reach listener audiences that current search engines are unable to locate or visualize for them, accordingly providing advertisers with highly targeted ad-placement in the digital audio space.

In accordance with one embodiment, there is provided a system for transforming audio content into digital and/or native advertising.

According to another embodiment, the platform-independent visualization of audio content system 100 is configured to compensate contributors of podcasts (audio tracks 124), i.e., to become the first podcast player 250 to pay its contributors—both audio and visual content creators—on a CPM and otherwise basis.

According to another embodiment, there is provided a system to make topic-segmented and visualized audio content social network, email, and/or text/messaging shareable. The platform-independent visualization of audio content system 100 transforms long-form audio into sound bites, allowing for both the long-form and short form versions of the same audio to be shared individually.

According to another embodiment, the platform-independent visualization of audio content system 100 provides search results for digital content audiovisual in nature. That is, audio search, discovery, navigation, and/or exploring related content are generated in visual form.

According to another embodiment, the visual assets predominantly utilized within the platform are those of trending formats. The cinemograph, or motion photograph (e.g., MP4 and GIF formatted data files), in which some portions of an image contain movement while others remain still, is the visual asset type most employed inside the platform, though additional visual asset types will be used.

According to another exemplary embodiment, the platform-independent visualization of audio content system 100 generates and grows a proprietary search engine and database containing audio, visuals, and text.

In accordance with another exemplary embodiment, the factors and variables around scoring artworks for incorporation into an audio track 124 first include a human curator rating every visual asset 128 when it is imported into the database, with respect to different "levels" and "tags". For example, a visual asset 128 may be assigned an overall aesthetic quality rating as well as subject matter and mood labels, to better the chances of a visual asset 128 being discovered when a curator searches for imagery most appropriate for any segment 126. Accordingly, it will be appreciated that the platform-independent visualization of audio content system 100 is suitably configured to traverse a logical tree of choices for visual asset 128 identification and selection.

According to another exemplary embodiment, the platform-independent visualization of audio content system 100 provides for the local stashing of data on a user device 200A-200D, i.e., downloading audio tracks 124 for later listening and viewing when in areas of poor or no Internet connectivity may occur. In accordance with one such implementation, the visual assets 128 to incorporate in the audio track 124 for cases of offline listening and viewing are pre-determined. Accordingly, the platform-independent visualization of audio content system 100 therefore runs logic on the server, i.e., the central computer system 102, so aside from downloading the recipe for visual assets 128, the central computer system 102 facilitates all other functions.

According to another embodiment, the platform-independent visualization of audio content system 100 employs at least one algorithm (such as algorithms 118, 119, 121, and 123 described above) to automatically generate various options for increased efficiency and ease with respect to the curatorial decision-making process. Suitable generated options may include, for example and without limitation: image selection options with respect to relevant sponsorship, subject matter, mood or theme, style, tags, quality level, trends, trending keywords, and/or demographics, as well as copy and related content suggestions based on topic and/or segment keywords, social relevancy, selected imagery, and/or news source credibility.

In another exemplary embodiment, the aforementioned algorithms executed by the central computer system 102 of the platform-independent visualization of audio content system 100 provides a proprietary methodology for increasing the efficiency of the human curatorial process, including, for example and without limitation: "segmenting" an audio track by breaking the audio track into topical audio segments 126 defined by time codes measurable in the tenths of a second, visual assets 128 (e.g., applicable artwork) categorizing and tagging, artwork "pulling" and transfer from database engine to curator's "dashboard" or "workshop" or "episodes" in production, suggesting what sponsors or affiliate sponsors would make the most sense as picks for any given segment or audio discussion or visual asset, transferring of segments and any parts of the curatorial process, including notations and requests, in both draft and finished states, to other members or divisions of the company and its partners for viewing, collaboration, or approval. A curator may, for example, "send" a version of the "dashboard" or "workshop" or "episode" to a copyrighter, the sales team, a technician for image support, an engineer for audio support, or a manager, sponsor, podcast creator, artist, or agency for feedback, approval, inquiry, or suggestion.

According to another embodiment, the platform-independent visualization of audio content system 100 utilizes a proprietary method for encrypting podcasts which are otherwise entirely public materials. It will therefore be appreciated that not only will the audio content system 100 make sense of the data, but also the audio could be protected with digital rights management of some kind. In a further implementation, the platform-independent visualization of audio content system 100 is capable of exclusive encryption of content, dependent upon various digital rights management associated with the audio track 124 and/or visual asset 128 or requested by the owner of said audio track 124 and/or visual asset 128.

According to another embodiment, the platform-independent visualization of audio content system 100 employs a method whereby certain segments designated by the segmentation module 114 are particularly set for advertising campaigns that have start and end date ranges, or target only a geographic region. In such an implementation of the platform-independent visualization of audio content system 100, a method for the automatic or manual swapping out of sponsor placements attached to any segment to meet this need is performed, including the automatic or manual replacement of sponsor placements on each segment to support the highest bidder of the keywords associated with that segment, particularly wherever there is not a fixed sponsorship placement on a segment.

According to another embodiment, the platform-independent visualization of audio content system 100 employs a method whereby certain visual assets 128 designated by the image searching module 116 are particularly set for sponsorship attachment or sponsorship consideration by any given participating sponsor, allowing advertisers to sponsor visual assets and visual asset pools and collections to which audio segments would later be applied.

In accordance with another embodiment, the platform-independent visualization of audio content system 100 enables personal webpages and "feeds" for all podcast creators, visual artists, and advertisers participating in the platform, containing all the audio, visual, and text-based content of their association, from segments to full episodes, all prepared as socially shareable bundles and as plugins for placement in external websites and/or blogs.

According to yet another embodiment, the platform-independent visualization of audio content system 100 allows for all content contributors and advertisers using the platform to set terms and specifications for both off-limit and preferable forms of content attachment. Suitable forms of content include, for example and without limitation, themes in spoken narrative, written copy, subject matter inside both audio and imagery, or specific companies and brands for which one would or would not want association.

In another embodiment, the platform-independent visualization of audio content system 100 includes a system for online upload and submission of artist/photographer/videographer works for consideration for storage in the associated database 144 and subsequent use in the visualization of audio content, i.e., audio tracks 124. According to one implementation, the platform-independent visualization of audio content system 100 generates a descriptive copy to describe the visual assets 128, their locations, fun facts about them, the process of making them, or any other copy from the creators for potential editing and use where their images are selected for segments.

According to another embodiment, the platform-independent visualization of audio content system 100 supports a "real-time" or almost "real-time" visualization of streaming radio and audio content, aided by a more intelligent algorithm, the streamlining of curatorial processing, and a robust visual database 144. In such an embodiment, the aforementioned dynamic or near-dynamic visualization of an audio track 124 utilizes the voice recognition module 112, the image-searching module 116, the database 144, as well as other third-party databases to enable the "real-time" or "almost real-time" visualization to accompany an audio track 124. It will be appreciated that this visualization may occur as the podcast 124 is being downloaded or while the user is listening to the audio track 124, provided the latter instance includes connectivity to the Internet 101, and/or the central computer system 102.

In accordance with yet another embodiment, the algorithm utilized by the platform-independent visualization of audio content system 100 includes a capability to customize any one user's visual experience atop a standard and unchanging audio track by way of the personal information, background, sex, age, location, and/or interests of the corresponding user as gathered in part via the user search, discovery, interaction, and/or play experience within the platform, and via optional Facebook® login to the platform/system 100. Accordingly, it will be appreciated that as the user is listening to an audio track 124, background processing by the central computer system 102 is being performed to auto-pull the most appropriate visual match for each segment from the pre-programmed pool of image options that curators assign to each segment of audio content. The algorithm matches user information and keywords and tags the user has been assigned in the database 144 to increase the relevancy of the visual assets 128 that appear for the user, unique individual by unique individual. The "recipe" for which visual assets 128 render for which listener is fixed in such a way that the listener can backtrack to earlier parts of the audio and expect the same visuals at the same times.

According to a further embodiment of the subject application, a user may utilize the audio content system 100 to view the visuals, i.e., visual assets 128 associated with a particular audio track 124, in a "sound off" mode, wherein the audio content of the audio track 124 is muted or otherwise disabled and the images 128 are viewed as a standalone experience. Furthermore, the user device 200A-200D may utilize memory 204 to "like", "bookmark", "save" or otherwise store visual assets 128, enabling the audio content system 100 to facilitate the discovery by users of art, in addition to functioning as a playback platform and/or an ambiance product.

Figure 7:
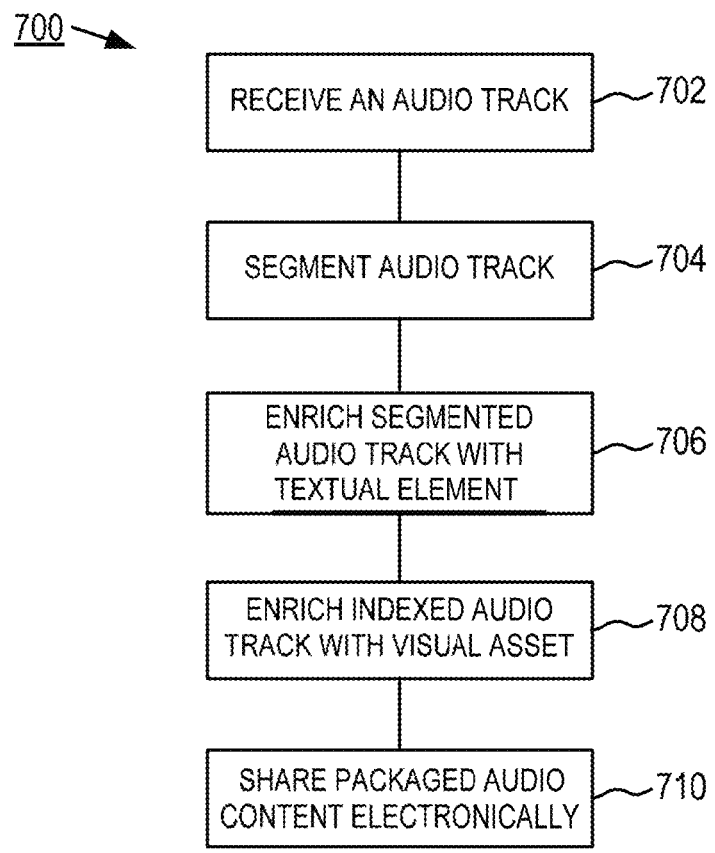
FIG. 7 is a flowchart of an exemplary method for visually packaging topical audio segments.

In accordance with another aspect of the present disclosure and with reference to FIG. 7, a flowchart of an exemplary method 700 for packaging audio segments is provided. The method segments long-playing audio tracks, e.g., audio tracks 124, into audio segments 126 and tags the audio segments with meaningful textual elements 122 while linking a visual asset 126 to the indexed audio segment. In this way, the audio segments 126 are easily searchable and sharable, e.g., via social media platforms. In some embodiments, the method 700 is implemented as a software program on a computing device. In other embodiments, the method 700 is implemented as a plug-in platform for use with other applications (third-party web-based applications or mobile applications).

The exemplary method 700 of FIG. 7 begins at block 702 with receiving an audio track, such as audio track 10 of FIG. 1 or audio track 124 of FIG. 5. Generally, the audio track is a long-form audio track having a duration of about a half hour or greater. However, it is to be appreciated that the long-form is non-limiting and that the method described herein is amenable to audio tracks of any length. The audio track may be provided as an electronic file (Audio Codec formats) commonly used for storing audio information, including but not limited to .wav, .mp3, wma, .aiff MPEG-4, FLAC and the like. In some embodiments, the method may extract the audio track from a video encoding format including but not limited to MP3, WMV, WEM, AVI, QuickTime®, etc.

At block 704, the audio track i.e., audio track 124 is segmented i.e., divided into individual chunks also referred herein as audio segments 126. Generally, each segment 126 corresponds to a thematically unified thought. In some embodiments, the segmentation of the audio track is based on discussed topics within the audio track, i.e., a topical audio segment. As a simple illustrative example, a long-form audio track containing a discussion about sports may be segmented according to each sport discussed. That is, the first ten minutes of audio may have discussions about basketball followed by a ten-minute discussion about baseball; thus, a segmentation module (such as module 114 described above) may segment that audio track into a first ten-minute audio segment about basketball and a second ten-minute audio segment about baseball.

In some embodiments, the segmentation of the audio track is performed by a curator as defined above. That is, a curator reviews/analyzes an entire audio track and records the start time and end time of at least one topic based on the discussion contained therein, defining a time zone of an audio track that corresponds to a topical audio segment, such as audio segment 128. In the sport example defined immediately above, a curator would note that from time t=0 to time t=10 minutes would be one audio segment (about basketball) and from time t=10 minutes to t=20 minutes would be a second audio segment (about baseball). The information regarding the audio segments (time zones bounded by transition times) is stored in a data storage, such as data storage 144 illustrated in FIG. 5. In some embodiments, the information is contained in a vector format as described above in relation to Equation 1.

In some embodiments, the segmentation is performed automatically via a computer processor and instructions by the utilization of computer algorithms, such as those defined above. In some embodiments, the segmentation by the segmentation module 114 is performed directly by analyzing the speech or spoken words contained in an audio track. In other embodiments, the speech or spoken words in an audio track are first converted to text (a text file) and the text is reviewed by the segmentation module for segmenting the audio track as described above.

At block 706, each segment of the segmented audio track is enriched with a textual element 122. In some embodiments, the textual element 122 is at least one keyword, wherein the keyword corresponds to the topic discussed within the segment. Continuing the sport example above, the first segment discussing basketball may be associated with the keyword "basketball" and/or if a particular basketball team is discussed, the team name may also be a keyword. In some embodiments, the textual element 122 is a meta-tag. Generally, a meta-tag is a short context descriptor that relates to the content described in the associated file/object.

In some embodiments, the textual element 122 is a summary. That is, a short textual summary of the core topic of the audio segment is generated and associated with the audio segment. In some embodiments, the summary of the topic is provided by a human curator, associated with the audio segment, and stored in a data storage, such as data storage 144. In other embodiments, the audio track is input into a summary algorithm 119, as described above, and the output is a short text (summary). In some embodiments, the summary is created directly from speech extracted from the audio track. In other embodiments, the speech of the audio track is converted to text and a descriptive copy (summary) is generated from the converted text.

In other embodiments, the textural element is a title. That is, a short phrase related to the overall theme of the topical audio segment is generated and associated with the audio segment, as described above. In some embodiments, a title is defined/created by a human curator and associated with the audio segment. In other embodiments, a titling algorithm (e.g., titling algorithm 123) is utilized to provide a title to the audio segment.

After an audio segment has been indexed with at least one textural element, the indexed audio file is stored within a data storage, such as data storage 144, and is further enriched with at least one visual asset 126 at block 708. That is, after being stored in a data storage 144, audio files representing topical audio segments 126 are selected and paired with at least one visual asset 128. In some embodiments, the visual assets 128 are also stored within a data storage 144. In other embodiments, a visual asset 128 is uploaded, e.g., by a user, and associated with the audio segment 126. In other embodiments, a unique visual asset is generated, for example, a collage combining portions of multiple visual assets. Generally, the visual asset 128 is one that compliments the core topic of the audio segment 126. In continuing the sports example above, the basketball audio segment may be paired with an image of a basketball or a particular basketball team logo.

In some embodiments, the visual asset 128 associated with the audio segment 126 is chosen by a computer algorithm. In other embodiments, the visual asset 128 associated with the audio segment 126 is chosen by a human curator. In some embodiments, the visual asset 128 is associated with a textual element e.g., keyword. In these exemplary embodiments, if a keyword associated with the visual asset 128 matches a textual element 122 of an indexed audio segment 126, the visual asset 128 is a candidate for pairing with the audio segment 126. In some embodiments, a single candidate visual asset 128 is chosen and paired to the indexed audio segment 126. In other embodiments, several candidate visual assets 128 are blended together into a collage or motion image (as described above) and then paired with the indexed audio segment 126.

After the indexed audio segment 126 is paired with a visual asset 128 at block 708, the audio segment is considered "packaged." That is, a topical audio segment 126 has been extracted or defined from an audio track (e.g., audio track 124) and associated with a textual element 122 and a visual asset 128. The packaged audio segment 126 is then capable for electronic sharing at block 710. That is, the packaged audio segment may be transferred (shared) across email, social media, websites, internet 101, etc. When the packaged audio segment is received or viewed by another party, e.g., a social media companion, it may be selected/ opened, and the corresponding audio of the audio segment 126 played via a media player embedded into an application or webpage, such as media player 7 of FIG. 1. Continuing the sport example above, a first user may email the basketball packaged audio segment in an email or on a social media profile page. A third party, intrigued by the visual asset 128 associated with the audio segment 126 or accompanying description, may select the packaged audio segment (e.g., hyperlink) and the audio segment 126 played in an audio player, such as media player 7 as described above in relation to FIG. 1, embedded in the platform or directed web-based application.

Figure 8:
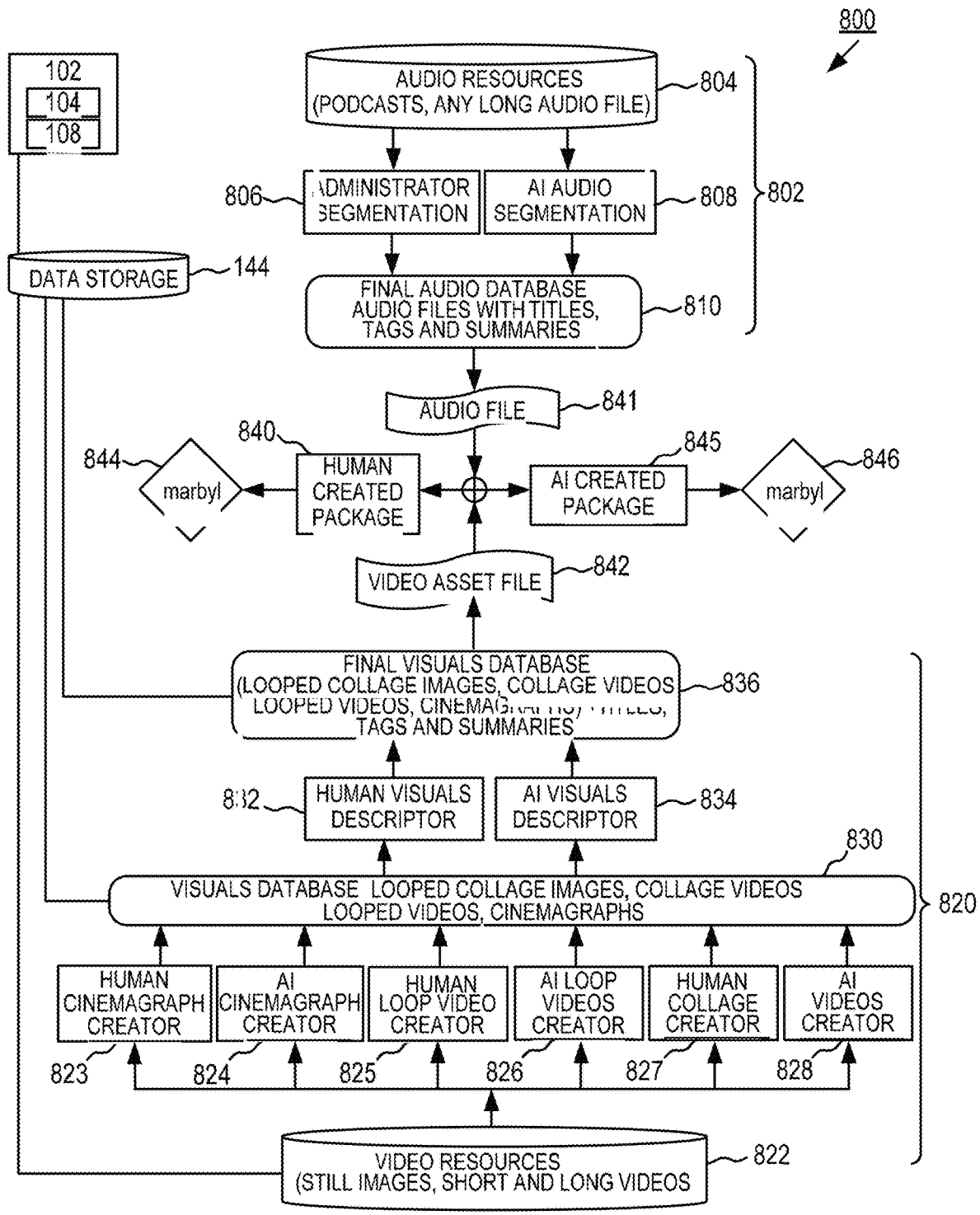
FIG. 8 is a system diagram of a system for visually packaging audio segments.

In accordance with another aspect of the present disclosure and with reference to FIG. 8, an exemplary content system 800 for creating visualized audio segments for searching and sharing is provided. The audio content system 800 may be implemented as a platform-independent visualization of audio content system including a central computer system such as computer system 102 having a processor 104, a data storage 144 and a memory 108 in communication with the processor 104, the memory 108 storing instructions 106 which are executed by the processor 104 to implement the platform-independent visualization system 800. In some embodiments, the instructions 106 define or otherwise allow the processor 104 to control subsystems, such as subsystems or modules 802 and 820 within the content system 800.

The content system 800 is divided into an audio subsystem 802 and a visual subsystem 820. The audio system 802 includes an audio resource 804 where audio files (tracks, podcasts 124) may be accessed. A non-liming example of an audio resource 804 is a data storage 144 storing audio tracks 124. The audio subsystem 802 is primarily tasked with the segmentation of audio tracks (e.g., audio tracks 124 and the like) into smaller audio files (audio segments 126) and then associating/describing the audio segments 126 with textual elements 122 including title, tags, descriptive summary, and the like, as described above. In some embodiments, the segmentation of audio tracks from the audio resource 804 and association of textual elements with audio segments is performed, at 806 by an administrator, or by a module similar to segmentation module 114 as described above. In some embodiments, the segmentation of audio tracks from the audio resource 804 and association of textual elements 122 with audio segments 126 is performed, at 808, by an artificial intelligence such as the learning algorithms described above. In other embodiments, the audio subsystem 802 utilizes both administrators and computer methods for segmenting audio tracks and enriching audio segments 126 with textual elements 122.

After the audio segment 126 is defined and indexed with at least one textual element 122, a file containing the audio data representing the audio segment 126 and associated textual elements 122 are transferred and stored into the final audio database (FADB) 810, which may be part of data storage 144. After being placed in the FADB 810, indexed audio segments 126 stored within are selected and paired with an accompanying visual asset 842, described in greater detail below, coming from the Final Visuals Database FVDB 836, stored in a data storage, such as data storage 144.

The visual sub-system 820 is generally responsible for the production of visual assets 842 that are combined with the audio segments 126 in the process of creating visualized audio segments. The visual subsystem 820 includes a Visual/Video resource 822 where visual assets 842 including still images and videos may be accessed, the video resource may be similar to a database of visual assets 128 stored in a data storage 144. In some embodiments, a human, at 823, accesses the visual resource and generates a cinemograph. In other embodiments, visual resources are input, at 824, into an AI cinemograph creator to generate a cinemograph visual asset, see FIG. 10. In some embodiments, a human, at 825, accesses the visual resources 822 and generates a video loop. In other embodiments, visual resources 822 are input, at 826, into an AI video loop creator to generate a video loop visual asset, see FIG. 11. In some embodiments, a human, at 827, accesses the visual resources 822 and generates a collage visual asset. In other embodiments, visual resources 822 are input, at 828, into an AI collage creator to generate a collage visual asset.

Figure 10:
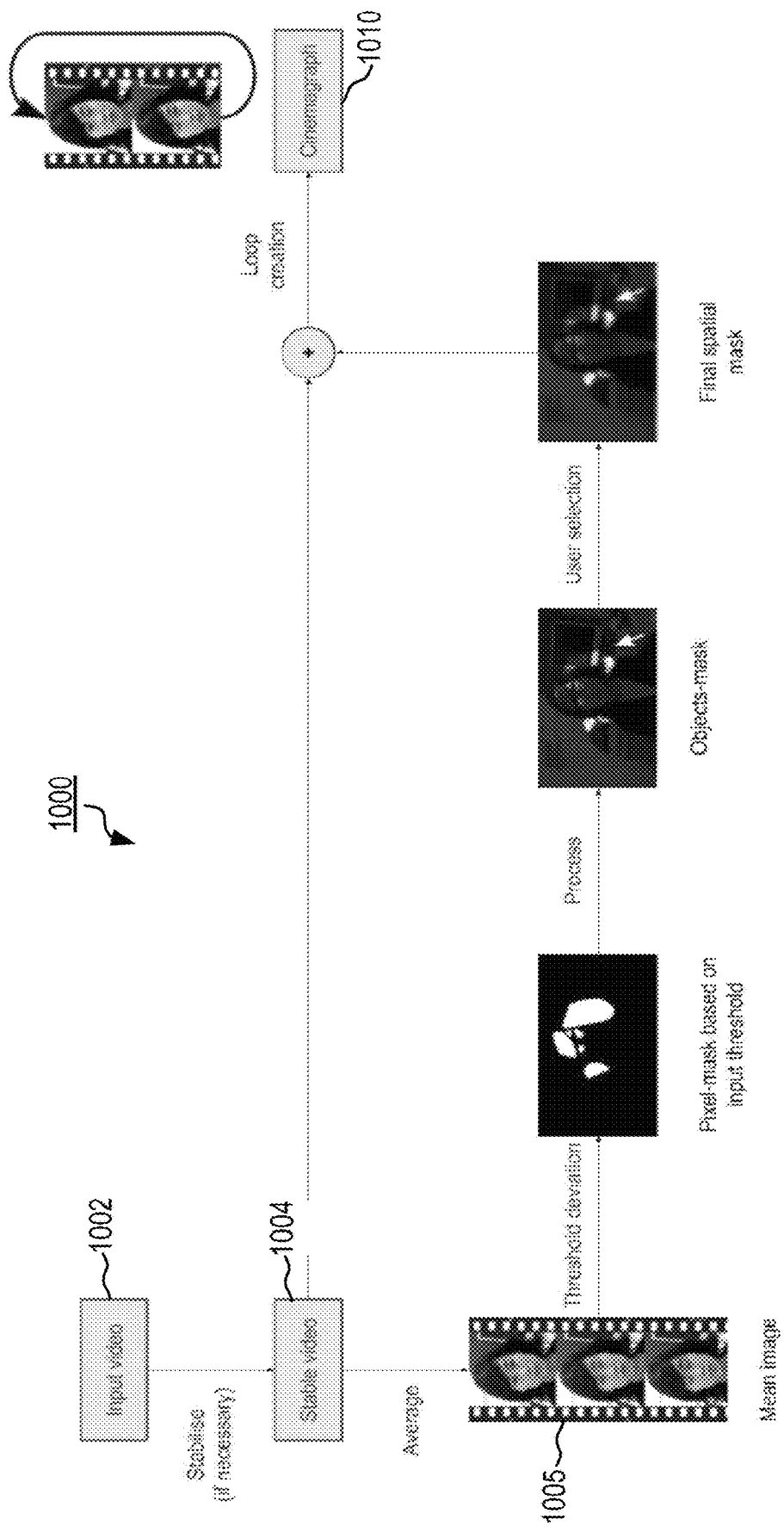
FIG. 10 is a block diagram of an exemplary cinemograph creator in accordance with the present disclosure.

FIG. 10 is a block diagram of an exemplary Cinemograph Creator 1000 in accordance with the present disclosure. The Cinemograph Creator 1000 automates the production of cinemographs 1010 from images and videos (input at 1002) available in a video resources, for example, visuals database 830. The cinemograph 1010 is generated based on textual elements (e.g., textual elements 122—tags, topics and descriptive copy) obtained from an audio segment, such as audio segment 126. In some embodiments, a motion description of an image may be provided or generated that will lead to the animation of a certain part of the image or video according to the motion description. The description can be also used to generate new cinemographs 1010 based on the existing resources. The cinemograph creator 1010 may start with the recognition of objects based on a description in images and videos and follow with using of the selected image(s)/videos(s) to produce Cinemographs 1010. In some embodiments, a video stabilization module 1004 is used to generate an average image using the mean value of frames 1005.

Figure 11:
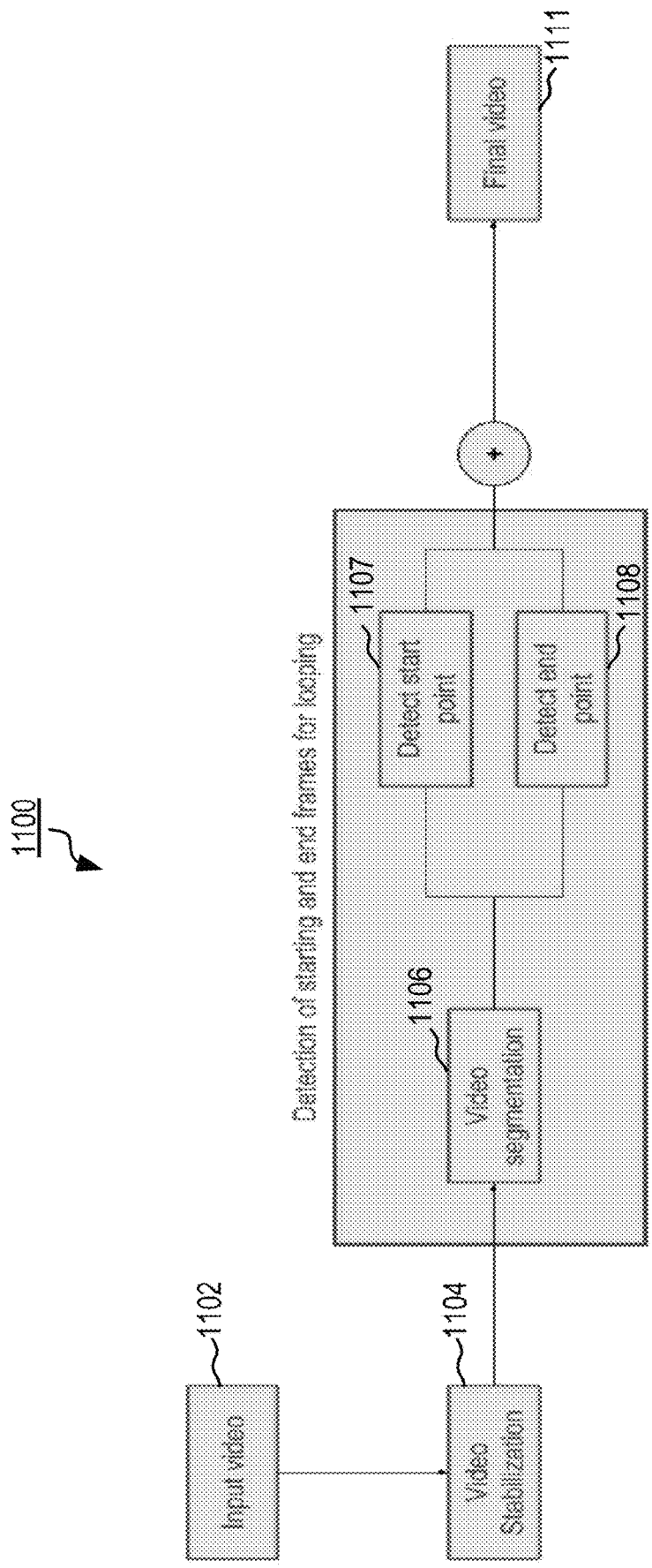
FIG. 11 is a block diagram of an exemplary video loop generator in accordance with the present disclosure.

FIG. 11 is a block diagram of a video loop creator 1100 for generating a final video loop 1111. Generally, video loops are generated only from videos differently from cinemograph which is generally, a visual asset 128 analogous to something between an image and video. That is, cinemographs, such as cinemograph 1010 animate a certain part of an image or video and a video loop 1111 animates the entire scenery. The Video Loop Creator 1100 automates the production of video loops 1111 from videos (input at 1102) available in a video resources, for example, visuals database 830. The video loop 1111 is generated based on textual elements (e.g., textual elements—tags, topics and descriptive copy) obtained from an audio segment, such as audio segment 126. In some embodiments, a video stabilization module 1104 is used to generate an average image using the mean value of frames. At block 1106, the video input at 1102 is segmented and a start point 1107 and end point 1108 of a video segment are defined (either by an administrator or through a Computer Vision Algorithm or Machine Learning Algorithm).

The prepared visual assets are stored in a visuals database 830, which also may be part of a data storage device, such as data storage 144. In some embodiments, the prepared visual assets are described/associated with textual elements 122, including titles, tags, and short summaries at 832, by a human. In some embodiments, the prepared visual assets are described/associated with titles, tags, and a descriptive copy at 834, by an AI algorithm, as described above. The indexed visuals (tagged with textual elements) are stored in a Final Visuals Database FVDB 836.

In some embodiments, at block 840, a human selects and pairs an indexed segmented audio file 841 with an indexed visual asset 842 and generates a packaged audio segment 844 ("Marbyl™"). In other embodiments, at block 845, a computer algorithm pairs an audio file 841 with a visual asset 842 and generates a packaged audio segment 846 (Marbyl™").

Figure 12:
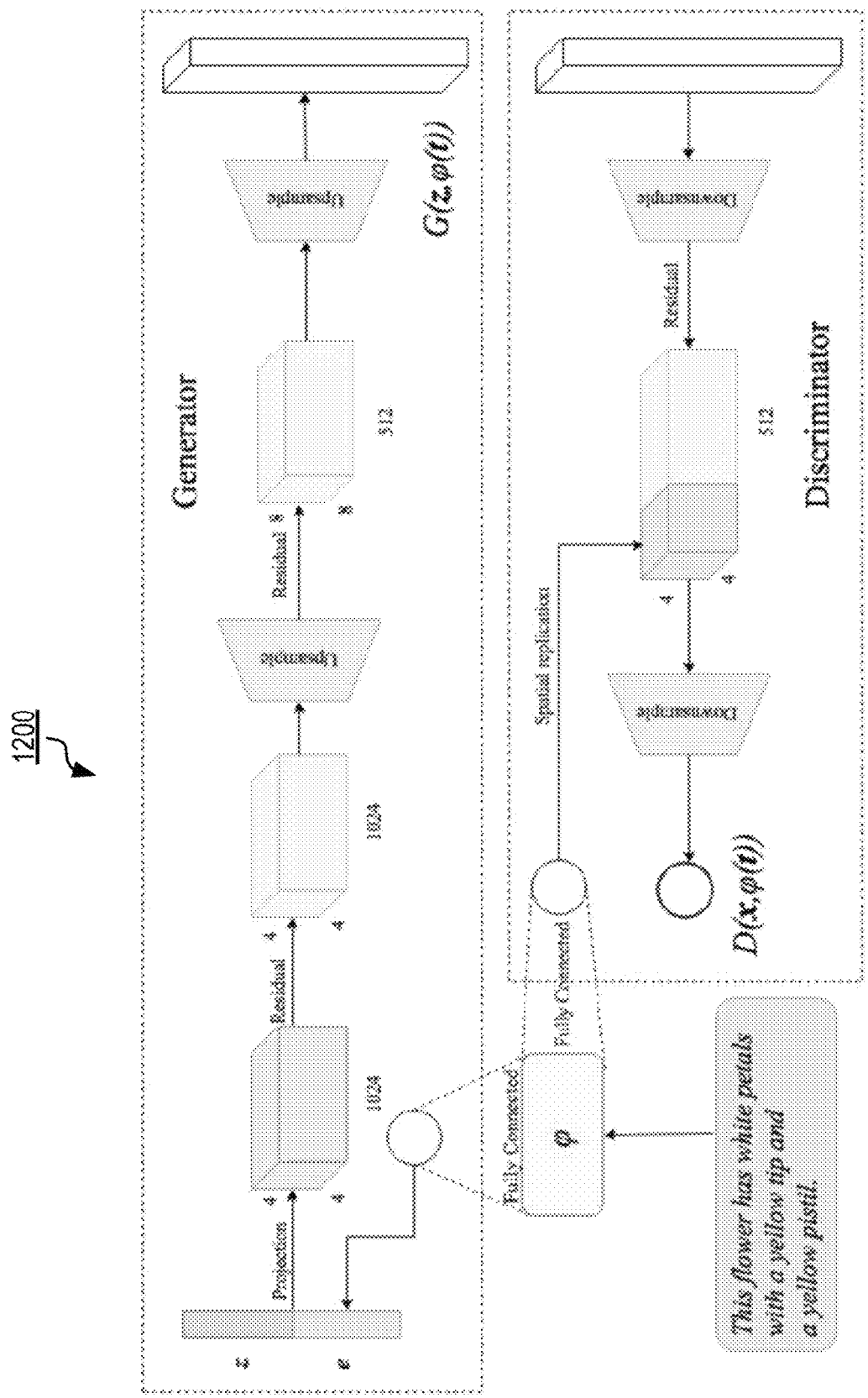
FIG. 12 a block diagram of an exemplary system for generating a visual asset from a textual element using a Generative Adversarial Network in accordance with the present disclosure.

FIG. 12 is a block diagram of an exemplary system 1200 for generating a visual asset 128 from a textual element 122 using a Generative Adversarial Network. That is, given a text description, a visual asset which matches that given text description must be generated. After partitioning audio, an algorithm, such as those described above, generates tags, titles and a descriptive copy that are used for generating a visual asset.

Figure 13A:
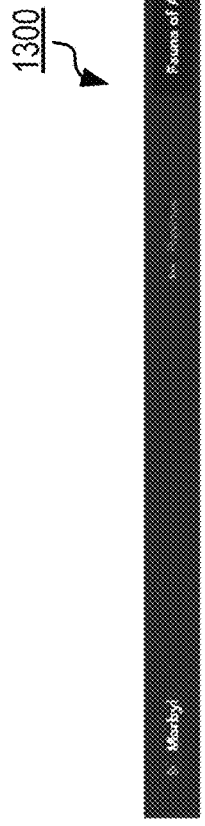
FIG. 13A-C are exemplary screenshots of a platform-independent visualization of audio content system in accordance with the present disclosure.
Figure 13A:
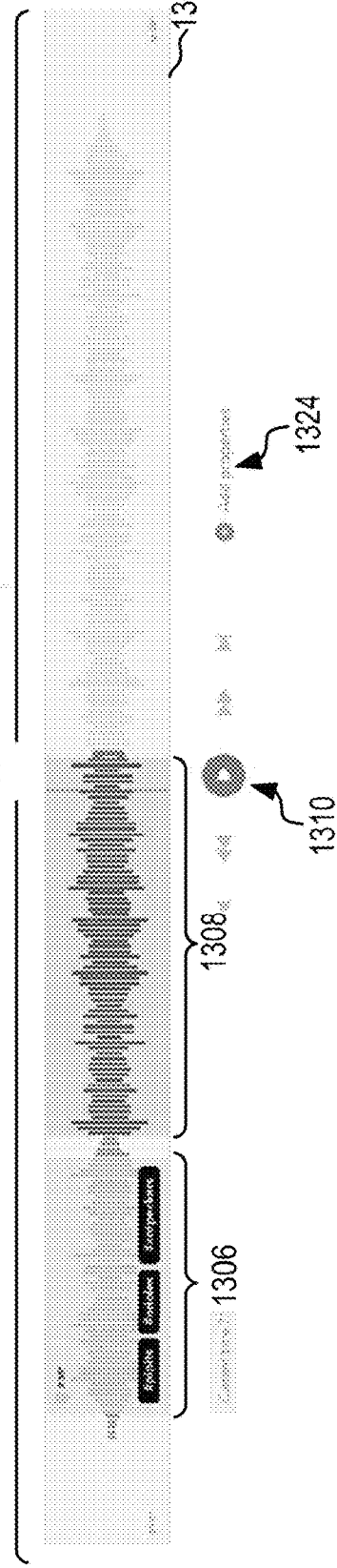
Figure 13B:
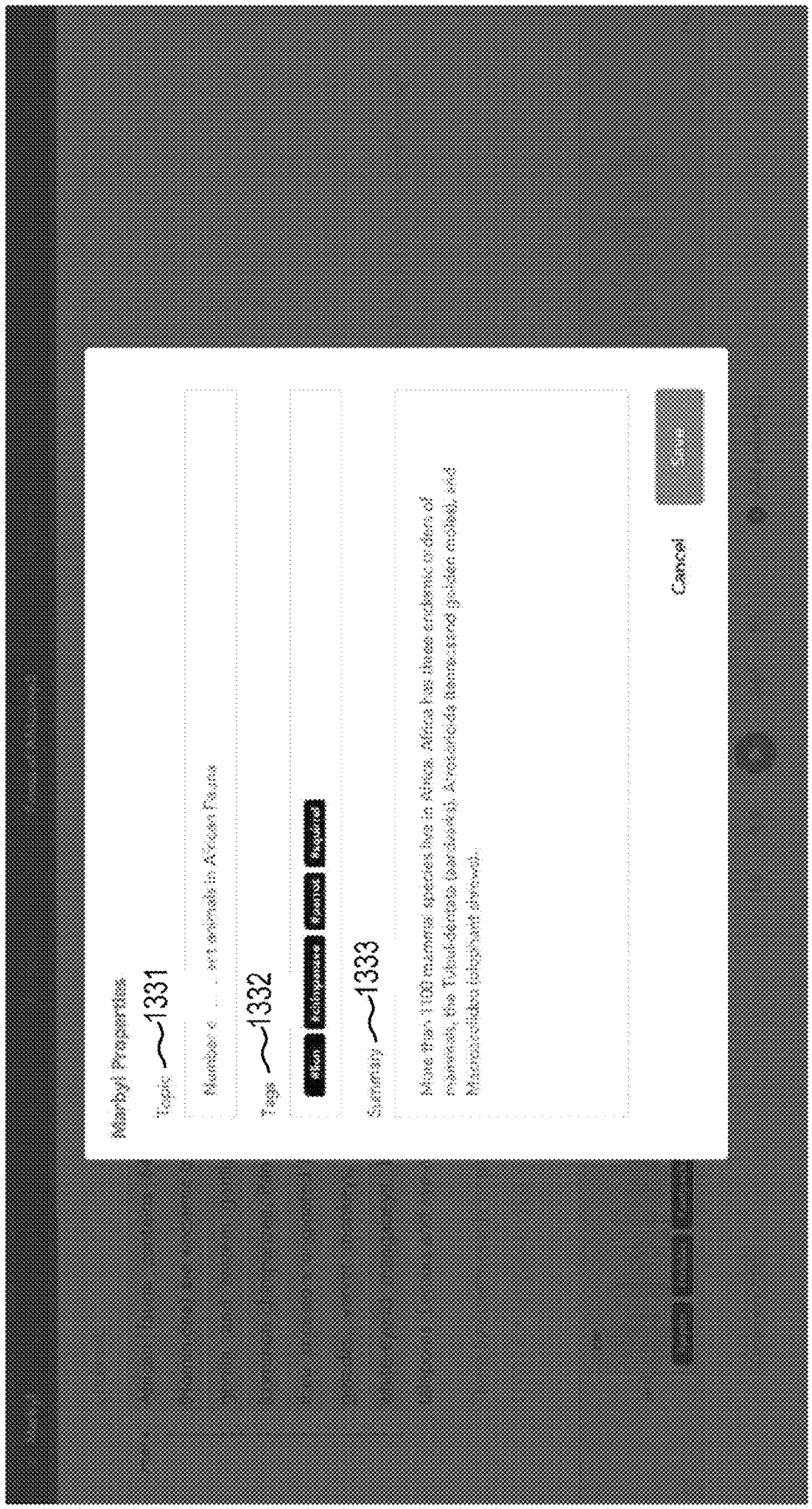
Figure 13C:

FIGS. 13A-13C are an exemplary embodiment of a platform-independent visualization of audio content system 1300. FIG. 13A illustrates an exemplary screen shot 1301 of a platform-independent visualization of audio content system 1300. In the lower part of the figure is a progress bar 1302 representing an entire audio track 1304. The progress bar 1302 includes two audio segments 1306 and 1308 of the audio track 1304. A media player 1310 is embedded in the software and is configured to manipulate (play, pause, rewind, forward) the audio of the audio track 1304. In some embodiments, the platform-independent visualization of audio content system 1300 provides the text 1320 of the spoken content of the audio track 1304, generated by a voice recognition module such as voice recognition module 112 of FIG. 5. The provided text 1320 may aid an administrator reviewing the audio content for better understanding of the subject and better labeling. In some embodiments, the audio content system provides a link 1324 that directs users and/or administrators to add/edit textual elements to an audio segment 1306, 1308, e.g., (title/topic 1331, keywords/tags 1332, and descriptive copy/summary 1333), illustrated in FIG. 13B.

FIG. 13C illustrates another exemplary screen shot of a platform-independent visualization of audio content system

1300. Based on the textual elements, e.g., 1331-1333, algorithms directed to generating and suggesting visual content as described above, will offer matching visual assets 1340. In some embodiments, users, administrators, and automated processes/devices may select certain visual assets 1340 for pairing with the audio segment 1306, 1308.

Figure 14A:
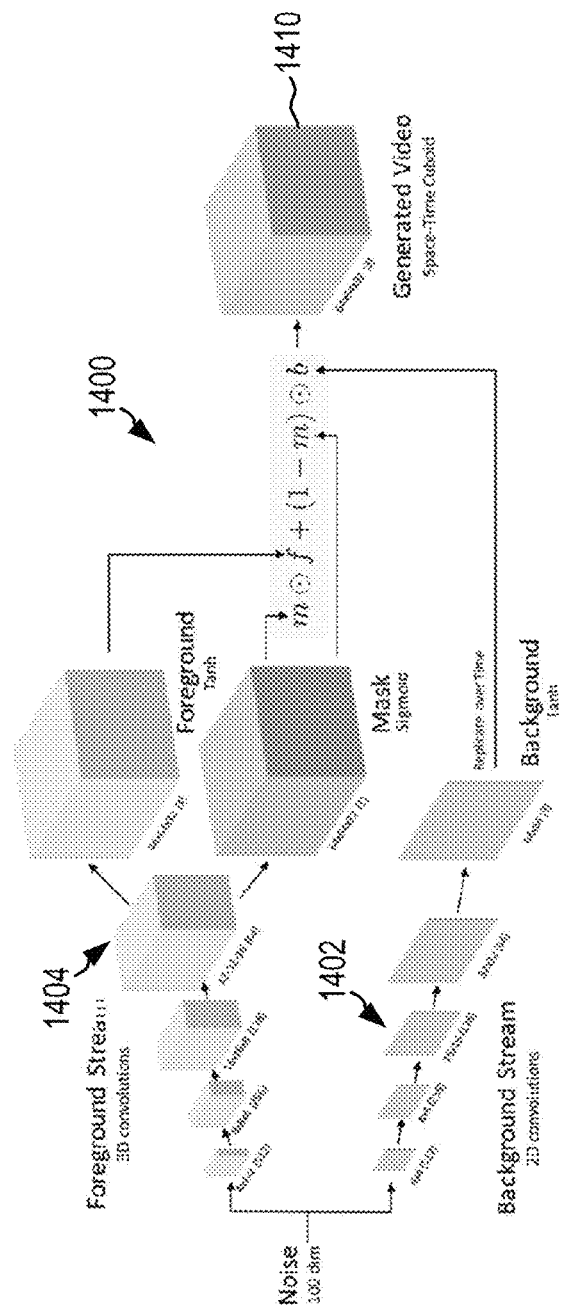
FIG. 14A is a block diagram of an exemplary image generator in accordance with the present disclosure.
Figure 14B:
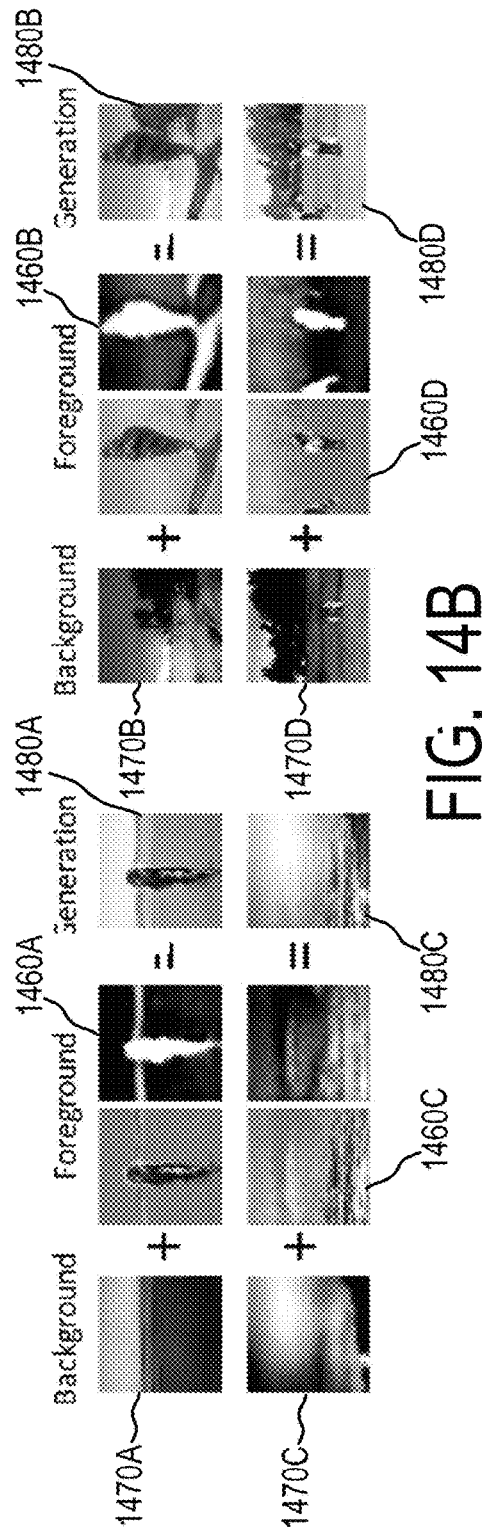
FIG. 14B illustrates exemplary images produced by the image generator of FIG. 14A.

In some embodiments and with reference to FIG. 14A, an AI Image Generator 1400 is utilized for the creation and/or assignment of visual assets, such as visual assets 128. The Image Generator 1400 takes background from one image (shown as image path 1402) and combines it with the foreground of another image (shown as image path 1404). In some embodiments, a collage is created by stitching the foreground and background images together. In other embodiments, multiple foreground and background images are stitched together, producing a cinemograph or short video 1410. Background and foregrounds are selected based on extracted tags, topic names, summaries, keywords, and the like. FIG. 14B illustrates exemplary visual assets 1480A-D, generated by the combination foreground 1460A-D and background 1470A-D elements.

The present disclosure is further illustrated in the following non-limiting working example, it is being understood that the example is intended to be illustrative only and that the disclosure is not intended to be limited to the materials, conditions, process parameters and the like recited herein. The example below illustrates an exemplary implementation of the technology disclosed herein.

First, a dataset of audio tracks (podcasts) was downloaded. Each podcast was at least a half an hour in length and up to one hour in length. The subject of the Podcasts in the dataset was "history" including Roman Empire, World Civilization, WWII, or similar. The dataset contained at least 1000 unique podcasts in the English language.

Next, the podcasts of the dataset were labeled with three different labels $L_1$-$L_3$ for each podcast were created.

Label Type One ($L_1$): A list of pairs, where each pair contains the start time and end time of each segment (e.g., segment 126).

$$L_1 = \{[s0\_start, s0\_end], [s1\_Start, s1\_end], \ldots\}$$

Label Type Two ($L_2$): A list of triplets, where each triplet contains the start time, end time, and a topic name of each segment (e.g., segment 126).

$$L_2 = \{[s0\_start, s0\_end, s0\_topic], [s1\_Start, s1\_end, s1\_topic], \ldots\}$$

Label Type Three ($L_3$): A list of triplets, where each triplet contains the start time, end time, and a summary name of each segment (e.g., segment 126).

$$L_3 = \{[s0\_start, s0\_end, s0\_summary], [s1\_Start, s1\_end, s1\_summary], \ldots\}$$

Next, Segmentation algorithms were made using all three labels ($L_1$-$L_3$) separately. For each label, a Segmentation Algorithm was built and, in the end, results were compared and evaluated.

Next, a pre-trained or new model was set up to convert speech to text, or available APIs for example, Google Cloud® or Watson IBM® or similar were used.

New labels from text from speech were generated, wherein each label was one of L4-L6.

Label Type Four ($L_4$): A list of pairs, where each pair contains the first word, and last word of each segment (e.g., segment 126).

$$L_4 = \{[s0\_first, s0\_last], [s1\_first, s1\_last], \ldots\}$$

Label Type Five ($L_5$): A list of triplets, where each triplet contains the first word, last word, and topic name of each segment (e.g., segment 126).

$$L_5 = \{[s0\_first, s0\_last, s0\_topic], [s1\_first, s1\_last, s1\_topic], \ldots\}$$

Label Type Six ($L_6$): A list of triplets, where each triplet contains the first word, last word, and summary of each segment (e.g., segment 126).

$$L_6 = \{[s0\_first, s0\_last, s0\_summary], [s1\_first, s1\_last, s1\_summary], \ldots\}$$

Lastly, another three Second Segmentation Algorithms were made using all three text labels ($L_4$-$L_6$) separately. For each label, the Second Segmentation Algorithms were built, and the results were compared and evaluated. The example described herein provided an understanding of the feasibility and scalability of each approach.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A method for packaging audio content by an audio content system to facilitate in viewing, searching and/or sharing of said audio content comprising:
    (a) providing an audio track and storing said audio track in a data storage;
    (b) converting content contained within said audio track to audio text;
    (c) using artificial intelligence to identify one or more interest segments of said audio text;
    (d) displaying one or more of said interest segments on an app or computer;
    (e) enabling a user to select at least one of said interest segments being displayed on said app or computer to enable said selected interest segment to be displayed in association with a portion of said audio text that exists prior to and/or after said interest segment selected by said user;
    (f) enabling said user to view a portion of said audio text that includes said interest segment selected by said user and/or to hear a portion of audio track that includes said interest segment selected by said user; and,
    (g) enabling said user to hear said audio track and/or view said audio text from said audio track from beginning to end.

2. The method as defined in claim 1, further including the steps of:
    pairing at least one visual asset to one or more of said interest segments by:
    (i) determining a proposed set of visual assets of a plurality of visual assets by performing an automated analysis of said one or more interest segments; and,
    (ii) using artificial intelligence to associate a particular visual asset to said one or more interest segments.

3. The method as defined in claim 2, wherein the at least one visual asset is one of an image, photograph, video, cinemograph, video loop, and/or collage.

4. The method as defined in claim 1, wherein said audio track is a podcast.

5. The method as defined in claim 1, wherein a voice recognition module is configured to convert content contained within said audio track to said audio text and a segmentation module is used to divide said audio signal into one or more of said interest segments based on keywords derived from said audio text.

6. The method as defined in claim 1, wherein a voice recognition module is configured to identify one or more of said interest segments directly from said content contained within said audio track; and wherein automated analysis of said audio track and/or audio text includes analyzing said audio track and/or audio text based on extracted keywords.

7. The method as defined in claim 1, further including storing one or more of said interest segments in an associated database.

8. The method as defined in claim 1, further including enabling third party advertising from third party advertisers to be displayed on said app or computer based at least in part on said interest segment being viewed by said user on said app or computer.

9. The method as defined in claim 1, wherein said artificial intelligence provides suggested new audio content to said user based on one or more of said interest segments selected by said user.

10. The method as defined in claim 1, wherein said user is able to share a) one or more of said interest segments and/or b) at least a portion of said audio track and/or audio text to one or more third parties via social network, email, and/or text/messaging.

\* \* \* \* \*